US012618274B2

(12) United States Patent
Liang et al.

(10) Patent No.: US 12,618,274 B2
(45) Date of Patent: May 5, 2026

(54) HINGE ASSEMBLY AND OPENING AND CLOSING DEVICE

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Benlei Liang, Hefei (CN); Chao Liu, Hefei (CN)

(73) Assignees: HEFE! MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 71 days.

(21) Appl. No.: 18/482,905

(22) Filed: Oct. 8, 2023

(65) Prior Publication Data

US 2024/0426151 A1 Dec. 26, 2024

(30) Foreign Application Priority Data

Jun. 20, 2023 (CN) ........................ 202310746653.3

(51) Int. Cl.
*E05D 3/02* (2006.01)
*E05F 3/18* (2006.01)
(Continued)

(52) U.S. Cl.
CPC .................. *E05D 3/02* (2013.01); *E05F 3/18* (2013.01); *E05F 3/20* (2013.01); *F25D 23/028* (2013.01); *F25D 2323/024* (2013.01)

(58) Field of Classification Search
CPC .... E05D 3/02; E05D 3/18; E05D 5/08; E05D 7/0054; E05D 2011/1035;
(Continued)

(56) References Cited

U.S. PATENT DOCUMENTS 3,975,794 A * 8/1976 Kaiser .................. E05F 1/1223 16/303
4,215,449 A * 8/1980 Loikitz .................. E05F 1/063 16/303
(Continued)

FOREIGN PATENT DOCUMENTS

CN 107165516 A 9/2017
CN 110593687 A 12/2019
(Continued)

OTHER PUBLICATIONS

First search report received in Chinese priority application No. 202310746653.3; mailed Jan. 22, 2025.
(Continued)

*Primary Examiner* — Jason W San
*Assistant Examiner* — Matthew J Sullivan
(74) *Attorney, Agent, or Firm* — K&L Gates LLP

(57) ABSTRACT

The present application relates to the field of household appliance technologies and discloses a hinge assembly and an opening and closing device. The hinge assembly includes a first matching member and a second matching member rotatably connected. The first matching member has a first curved surface and a second curved surface at one end, and the second matching member has a third curved surface and a fourth curved surface at one end. The first matching member and the second matching member have a first state and a second state. The first matching member and the second matching member are rotatable relative to each other around a first axis to be switchable between the first state and the second state. In the first state, the first curved surface abuts against and is matched with the third curved surface.

19 Claims, 16 Drawing Sheets

(51) Int. Cl.
*E05F 3/20* (2006.01)
*F25D 23/02* (2006.01)

(58) Field of Classification Search
CPC ............. E05D 2011/1038; E05D 11/06; E05F 1/1223; E05F 3/20; E05Y 2201/638; F25D 23/028; F25D 2323/024
See application file for complete search history.

(56) References Cited

U.S. PATENT DOCUMENTS

| | | | | |
|---|---|---|---|---|
| 7,062,817 | B2 * | 6/2006 | Lee | E05F 1/1223 16/334 |
| 7,320,152 | B2 * | 1/2008 | Lowry | G06F 1/1616 16/334 |
| 7,383,618 | B2 * | 6/2008 | Lu | H04M 1/0216 16/303 |
| 7,818,845 | B2 * | 10/2010 | Hu | H04M 1/0216 16/303 |
| 8,444,234 | B2 * | 5/2013 | Kim | D06F 39/14 312/328 |
| 8,745,820 | B2 * | 6/2014 | Janak | E05F 1/1215 188/290 |
| 8,770,675 | B2 * | 7/2014 | Vom Stein | F16J 15/3456 305/105 |
| 9,290,880 | B2 * | 3/2016 | Park | D06F 39/14 |
| 9,291,385 | B2 * | 3/2016 | Hwang | E05D 7/00 |
| 9,394,645 | B2 * | 7/2016 | Park | D06F 39/14 |
| 9,416,574 | B2 * | 8/2016 | Mitchell | E05F 1/1223 |
| 9,957,743 | B2 * | 5/2018 | Chen | E05F 5/10 |
| 9,995,069 | B2 * | 6/2018 | Ghantous | E05F 1/043 |
| 11,435,024 | B2 * | 9/2022 | Chen | E05F 1/1215 |
| 11,767,694 | B2 * | 9/2023 | Naganuma | E05D 11/1078 16/221 |
| 12,139,951 | B2 * | 11/2024 | Lehti | E05D 11/06 |
| 2005/0091794 | A1 | 5/2005 | Kang | |
| 2006/0032022 | A1 * | 2/2006 | Minami | G06F 1/1681 16/342 |
| 2006/0242792 | A1 * | 11/2006 | Kienle | E05D 11/1078 16/252 |
| 2009/0126154 | A1 * | 5/2009 | Lin | G06F 1/1681 16/286 |
| 2024/0068286 | A1 * | 2/2024 | Larson | E05D 11/1078 |
| 2024/0209664 | A1 * | 6/2024 | Liang | E05D 3/02 |
| 2024/0426151 | A1 * | 12/2024 | Liang | E05D 11/1014 |

FOREIGN PATENT DOCUMENTS

| | | | | | |
|---|---|---|---|---|---|
| CN | 217950072 | U | | 12/2022 | |
| CN | 116146062 | A | | 5/2023 | |
| EP | 3384116 | B1 | | 10/2020 | |
| IT | 201900005910 | A1 | | 10/2020 | |
| KR | 100688943 | B1 | | 3/2007 | |
| KR | 101236011 | B1 | | 2/2013 | |
| KR | 20140030760 | A | * | 3/2014 | E05D 3/02 |
| KR | 101920970 | B1 | * | 11/2018 | E05F 3/20 |
| KR | 102773217 | B1 | * | 2/2025 | E06B 7/367 |

OTHER PUBLICATIONS

EESR received in EP Application No. 23203662.4, mailed Mar. 18, 2024.

* cited by examiner

HINGE ASSEMBLY AND OPENING AND CLOSING DEVICE

CROSS-REFERENCES TO RELATED APPLICATIONS

The present disclosure claims the priority of Chinese Patent Application No. 202310746653.3, filed with the Chinese Patent Office on Jun. 20, 2023, the entireties of which are herein incorporated by reference.

FIELD

The present application relates to the field of household appliance, and in particular, to a hinge assembly and an opening and closing device.

BACKGROUND

This section only provides background information related to the present application and does not necessarily refer to prior art.

A freezer is a common type of opening and closing device, and it is generally provided with an upward opening door structure. When a door body of the freezer is opened, it is necessary to overcome the gravity of the door body, which makes it laborious to open the door. When closing the door body of the freezer, the door body may fall fast due to the gravity, causing a severe collision between the door body and a cabinet body of the freezer, and then affecting the user's experience. In some cases, such as when the door seal compensation is insufficient, the door body of the freezer may be not closed tightly, which results in air leakage and affects the refrigerating or freezing effect of the freezer, increases the energy consumption of the freezer, and results in poor user's experience.

SUMMARY

The purpose of the present application is to at least alleviate the problems that a door body of an opening and closing device such as a freezer is laborious to be opened and not tightly closed. The purpose of the present application is achieved by the following solution.

In one embodiment of the present application provides a hinge assembly, including:

- a first matching member, provided with a first curved surface and a second curved surface at one end of the first matching member;
- a second matching member, provided with a third curved surface and a fourth curved surface at one end of the second matching member;
- where the hinge assembly has a first state and a second state, and the first matching member and the second matching member are rotatable relative to each other around a first axis to be switchable between the first state and the second state; and in the first state, the first curved surface abuts against and is matched with the third curved surface to make the first matching member and the second matching member have a first acting force under an axial force; and in the second state, the second curved surface abuts against and is matched with the fourth curved surface to make the first matching member and the second matching member have a second acting force under the axial force; the first acting force and the second acting force have opposite directions.

According to the present application, in the first and the second states, the hinge assembly may have a force rotating the first matching member and the second matching member in opposite directions under the axial force, one of the first state and the second state corresponds to a closed state or a nearly closed state of the door body of the opening and closing device, and the other of the first state and the second state corresponds to an opening state of the door body of the opening and closing device. When the door body of the opening and closing device is in the opening state, the first matching member and the second matching member provide upward opening assistance to the door body under the axial force, which facilitates the opening operation of the door body and helps the door body suspend in the opening state; and when the door body moves from the opening state to the closed state, it may also offset a part of gravity and reduce the risk of rapid descent of the door body. When the door body of the opening and closing device is in the closed state, the first matching member and the second matching member provide downward pressing assistance to the door body under the axial force, which reduces the possibility that the door body is not closed tightly and improves the user's experience.

The hinge assembly according to the present application may have the following additional features:

in some embodiments, the first surface, the second surface, the third surface, and the fourth curved surface are helical surfaces, the first curved surface and the second curved surface have opposite helical directions, the third curved surface and the fourth curved surface have opposite helical directions, the first curved surface and the third curved surface have the same helical direction, and the second curved surface and the fourth curved surfaces have the same helical direction.

In some embodiments, the first curved surface, the second curved surface, the third curved surface and the fourth curved surface all extend helically in a direction of the first axis.

In some embodiments, the first curved surface and the second curved surface are disposed in sequence along a circumferential direction of the first matching member, and the third curved surface and the fourth curved surface are disposed in sequence along a circumferential direction of the second matching member, and both the circumferential direction of the first matching member and the circumferential direction of the second matching member are perpendicular to the direction of the first axis.

In some embodiments, the first matching member has a first matching surface disposed between the first curved surface and the second curved surface;

the second matching member has a second matching surface disposed between the third curved surface and the fourth curved surface; and both the first matching surface and the second matching surface are perpendicular to the direction of the first axis, and the hinge assembly has a third state between the first state and the second state; and in the third state, the first matching surface abuts against and is matched with the second matching surface.

In some embodiments, both the first curved surface and the second curved surface are provided on a side of the first matching surface away from the second matching member, and both the third curved surface and the fourth curved surface are provided on a side of the second matching surface away from the first matching member.

In some embodiments, the first matching member has a stop surface connected to an end of the second curved surface away from the first matching surface; and/or the second matching member further has a stop surface connected to an end of the fourth curved surface away from the second matching surface.

In some embodiments, the first matching member includes first protrusion portions disposed at intervals along a circumferential direction of the first matching member, and each of the plurality of first protrusion portions is provided with the first curved surface and the second curved surface;

the second matching member includes second protrusion portions disposed at intervals along a circumferential direction of the second matching member, and each of the plurality of second protrusion portions is provided with the third curved surface and the fourth curved surface; and the plurality of the first protrusion portions are provided in one-to-one correspondence with the plurality of the second protrusion portions; and both the circumferential direction of the first matching member and the circumferential direction of the second matching member are perpendicular to the direction of the first axis.

In some embodiments, at least one of the first curved surface, the second curved surface, the third curved surface or the fourth curved surface is provided with an oil storage tank.

In some embodiments, the hinge assembly further includes:

a first hinge seat, where the first hinge seat is connected to the first matching member, and the first hinge seat rotates synchronously with the first matching member;

a second hinge seat, where the second hinge seat is connected to the second matching member, and the second hinge seat rotates synchronously with the second matching member;

the first hinge seat is rotatably connected to the second hinge seat, and the first matching member is slidably connected to the first hinge seat in a direction of the first axis and/or the second matching member is slidably connected to the second hinge seat in a direction of the first axis.

In some embodiments, the first hinge seat is provided with a first accommodating cavity extending in a direction of the first axis, and the second hinge seat is provided with a second accommodating cavity extending in a direction of the first axis, and the first accommodating cavity communicates with the second accommodating cavity, and the first matching member is disposed in the first accommodating cavity, and the second matching member is disposed in the second accommodating cavity.

In some embodiments, the first hinge seat is integrated with the first matching member, and the second matching member is slidable within the second accommodating cavity in the direction of the first axis.

In some embodiments, the hinge assembly further includes an elastic member, provided in the second accommodating cavity and located at a side of the second matching member away from the first matching member, and the elastic member applies the axial force to the second matching member and the first matching member.

In some embodiments, the first hinge seat includes a first lock plate and a first hinge portion, and the first lock plate is integrated with the first hinge portion, and the first accommodating cavity is provided in the first hinge portion;

the second hinge seat includes a second lock plate and a second hinge portion, and the second lock plate is integrated with the second hinge portion, and the second accommodating cavity is provided in the second hinge portion; and the first hinge portion is rotatably connected to the second hinge portion.

In some embodiments, a relief hole is disposed at an end of the first hinge portion away from the second hinge portion, and the relief hole communicates with the first accommodating cavity; and/or a relief hole is disposed at an end of the second hinge portion away from the first hinge portion, and the relief hole communicates with the second accommodating cavity.

In some embodiments, the first hinge seat is provided with a first positioning portion, and the second hinge seat is provided with a second positioning portion; and the second positioning portion is matchable with the first positioning portion to position the first hinge seat and the second hinge seat at an initial mounting angle, and the first positioning portion is dis-connectable from the first hinge seat, and/or the second positioning portion is dis-connectable from the second hinge seat.

In one embodiment of the present application provide an opening and closing device, including:

a cabinet, having an opening; and a door body, hinged to the opening of the cabinet through the hinge assembly mentioned above.

The hinge assembly according to the present application may also have the following additional features:

in some embodiments, the opening and closing device is a freezer.

BRIEF DESCRIPTION OF THE DRAWINGS

The accompanying drawings are only intended to illustrate some embodiments and are not considered as a limitation of the present application. And throughout the accompanying drawings, the same components are represented by the same reference numerals. In the accompanying drawings.

REFERENCE NUMERALS

Figure 1:
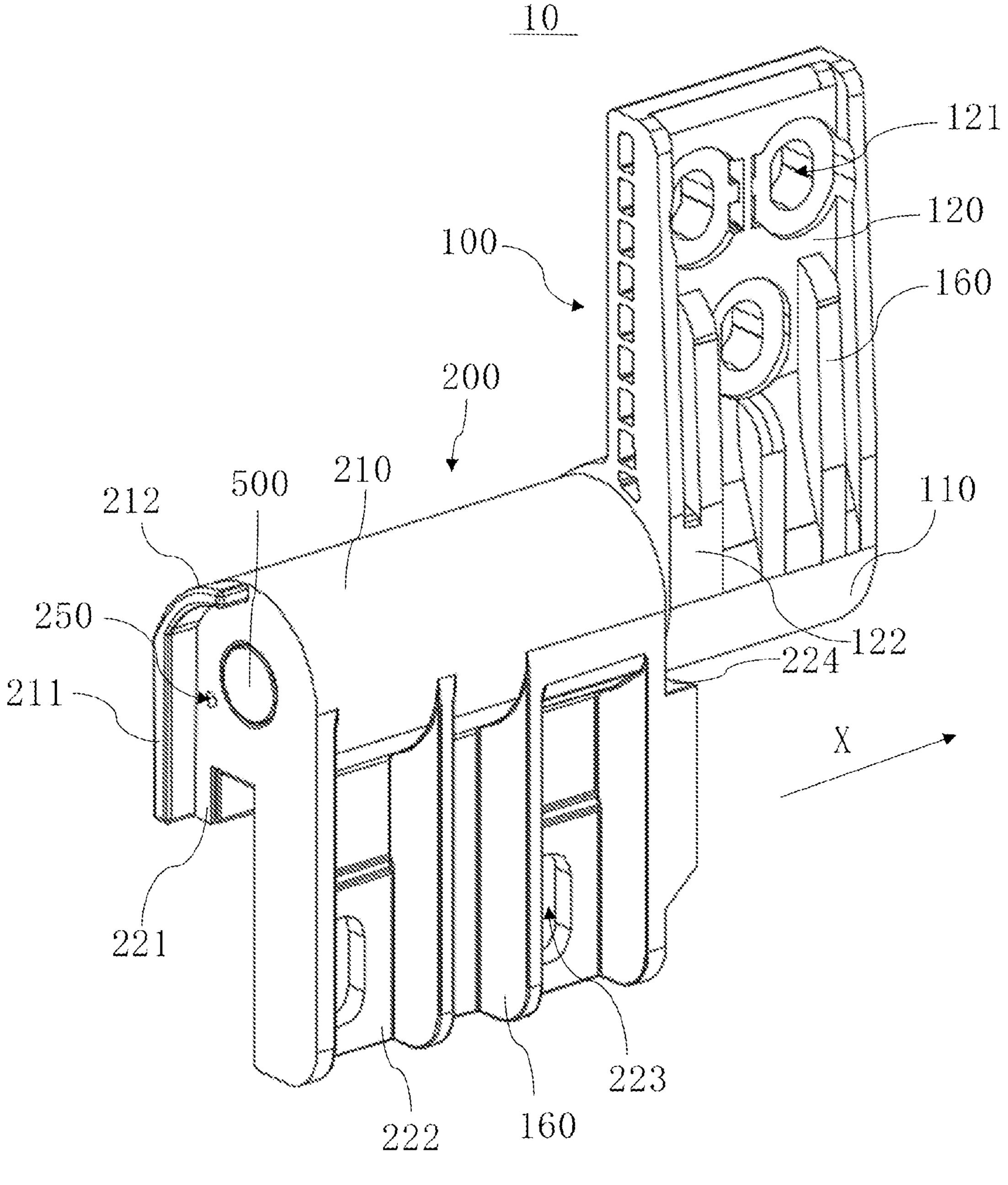
FIG. 1 schematically illustrates a schematic diagram of a hinge according to an embodiment of the present application.

- 10: hinge assembly;
- 100: first hinge seat; 110: first hinge portion; 111: second connecting surface; 112: annular step; 113: annular groove; 120: first lock plate; 121: first mounting hole; 122: first stop; 130: first accommodating cavity; 140: first matching member; 141: first curved surface; 142: second curved surface; 143: first bottom surface; 144: oil storage tank; 145: first matching surface; 146: first protrusion portion; 150: first positioning portion; 160: reinforcing rib;
- 200: second hinge seat; 210: second hinge portion; 211: raised strip; 212: extension portion; 213: annular boss; 214: annular protrusion; 215: first connecting surface; 221: first sub-lock plate; 222: second sub-lock plate; 223: second mounting hole; 224: second stop; 230: second accommodating cavity; 231: second guiding structure; 240: second positioning portion; 250: relief hole;
- 300: second matching member; 310: second matching structure; 311: third curved surface; 312: fourth curved surface; 313: second bottom surface; 314: second matching surface; 315: stop surface; 316: second protrusion portion; and 320: first guiding structure;
- 400: elastic member;
- 500: connecting shaft; 510: through hole;
- 600: shim; 610: notch;
- 20: cabinet; 202: third opening; 203: fourth opening; 204: mounting cavity; 105: trench; 206: opening; 207: slot;
- 30: door body;
- X: direction of first axis.

DETAILED DESCRIPTION OF THE DISCLOSURE

Exemplary implementations of the present application are described in more detail below with reference to the accompanying drawings. Although exemplary implementations of the present application are shown in the accompanying drawings, it should be understood that the present application may be implemented in various forms and should not be limited by the implementations described here.

It should be understood that the terms used herein are only used for the purpose of describing particular exemplary implementations and are not intended to be limiting. The singular forms "one", "a", and "said" as used herein may be expressed to include plural forms unless the context clearly indicates otherwise. The terms "including", "comprising", "containing", and "having" are inclusive and thus specify the presence of the stated features, steps, operations, elements and/or components, but do not exclude the presence or addition of one or more other features, steps, operations, elements, components, and/or combinations thereof. The method steps, processes, and operations described herein are not to be construed as necessarily requiring them to be performed in the particular order described or illustrated unless the order of performance is clearly indicated. It should also be understood that additional or alternative steps may be used.

Although the terms first, second, third, etc. may be used herein to describe elements, components, regions, layers and/or segments, however, the elements, components, regions, layers and/or segments should not be limited by these terms. These terms may be only used to distinguish one element, component, region, layer, or segment from another. Words such as "first", "second", and other numerical terms are used herein do not imply order or sequence unless the context clearly indicates otherwise. The first element, component, region, layer, or segment discussed below may be referred to as a second element, component, region, layer, or segment without departing from the teachings of the exemplary implementations.

For ease of description, spatial relativity terms, such as "internal", "external", "inside", "outside", "below", "under", "above", and "over", may be used herein to describe the relationship between one element or feature shown in the figure and another element or feature. The spatial relativity terms intend to include different orientations of the apparatus in use or operation other than those depicted in the drawings. For example, when the apparatus in the figure is flipped over, an element described as "below other elements or features" or "under other elements or features" is oriented as "above other elements or features" or "over other elements or features". The example term "below" may include both upper and lower orientations. The apparatus may be additionally oriented (rotated by 90 degrees or in other directions) and the spatial relativity descriptors used herein are interpreted accordingly.

As shown in FIG. 1 to FIG. 21, according to an embodiment of the present application, a hinge assembly 10 is provided, including a first matching member 140 and a second matching member 300 that are rotatably connected. One end of the first matching member 140 is provided with a first curved surface 141 and a second curved surface 142, and one end of the second matching member 300 is provided with a third curved surface 311 and a fourth curved surface 312.

The end of the first matching member 140 provided with the first curved surface 141 and the second curved surface 142 abuts against the end of the second matching member 300 provided with the third curved surface 311 and the fourth curved surface 312 correspondingly. The first curved surface 141, the second curved surface 142, the third curved surface 311, and the fourth curved surface 312 may all extend along the direction X of the first axis, where the direction X of the first axis is the axis direction along which the first matching member 140 rotates relative to the second matching member 300.

The first matching member 140 may include a first protrusion portion 146 protruding towards the first matching member 140, and both the first curved surface 141 and the second curved surface 142 are disposed on the surface of the first protrusion portion 146. The second matching member 300 may include a second protrusion portion 316 protruding towards the first matching member 140, and both the third curved surface 311 and the fourth curved surface 312 are disposed on the surface of the second protrusion portion 316.

The first curved surface 141 and the second curved surface 142 may be disposed sequentially along a circumferential direction of the first matching member 140, the third curved surface 311 and the fourth curved surface 312 may be disposed sequentially along a circumferential direction of the second matching member 300, and both the circumferential direction of the first matching member 140 and the circumferential direction of the second matching member 300 are perpendicular to the direction X of the first axis.

The hinge assembly 10 has a first state and a second state, and the first matching member 140 and the second matching member 300 are rotatable relative to each other around the first axis to be switchable between the first state and the second state. In the first state, the first curved surface 141 abuts against and is matched with the third curved surface 311 to make the first matching member 140 and the second matching member 300 have a first acting force under an axial force. In the second state, the second curved surface 142 abuts against and is matched with the fourth curved surface 312 to make the first matching member 140 and the second matching member 300 have a second acting force under the axial force. The first acting force and the second acting force have opposite directions.

The direction of the axial force may be the same as the direction of the first axis. The axial force may be applied through an elastic member, such as a spring.

According to the hinge assembly of the present application, in the first and the second states, the hinge assembly 10 may have an acting force that rotates the first matching member 140 and the second matching member 300 in opposite directions under the axial force, one of the first state and the second state may correspond to a closed state or a nearly closed state of the door body 30 of the opening and closing device, and the other of the first state and the second state may correspond to an opening state of the door body 30 of the opening and closing device. When the door body 30 of the opening and closing device is in the opening state, the first matching member 140 and the second matching member 300 may provide upward opening assistance to the door body 30 under the axial force, which facilitates the opening operation of the door body 30 and helps the door body 30 suspend in the opening state; and when the door body 30 moves from the opening state to the closed state, it may also offset a part of gravity and reduce the risk of rapid descent of the door body 30. When the door body 30 of the opening and closing device is in the closed state, the first matching member 140 and the second matching member 300 may provide downward pressing assistance to the door body 30 under the axial force, which reduces the possibility that the door body 30 is not closed tightly and improves the user experience.

It should be noted that for the convenience of description, embodiments of the present application subsequently describe the relevant programs mainly in terms of a first state corresponding to an opening state of the door body 30 of the opening and closing device, and a second state corresponding to a closed state or a nearly closed state of the door body 30 of the opening and closing device.

In an implementation, the first curved surface, the second curved surface, the third curved surface, and the fourth curved surface are helical surfaces, the first curved surface and the second curved surface have opposite helical directions, the third curved surface and the fourth curved surface have opposite helical directions, the first curved surface and the third curved surface have the same helical direction, and the second curved surface and the fourth curved surfaces have the same helical direction.

The first curved surface, the second curved surface, the third curved surface, and the fourth curved surfaces all extend helically in the direction of the first axis.

Since the first curved surface 141 and the curved second surface 142 have opposite helical directions, and the third curved surface 311 and the fourth curved surface 312 have opposite helical directions, in both the first and second states, the first matching member 140 and the second matching member 300 may generate an acting force for rotating the first matching member 140 and the second matching member 300 in opposite directions under the same axial force.

It should be noted that the first matching member 140 and the second matching member 300 may rotate relative to each other along the axis direction through the force generated by the elastic member 400, such as a spring. The spring may be disposed outside the hinge structure or integrated into the hinge structure as a part of the hinge structure. The embodiment subsequently specifies a way in which the hinge assembly 10 has a built-in elastic member 400.

As shown in FIG. 3 to FIG. 6, in some embodiments, the first matching member 140 further has a first matching surface 145 disposed between the first curved 141 and the second curved 142; and the second matching member 300 further has a second matching surface 314 disposed between the third curved surface 311 and the curved fourth surface 312. Both the first matching surface 145 and the second matching surface 314 are perpendicular to the direction X of the first axis. The hinge assembly has a third state. In the third state, the first matching surface 145 abuts against and is matched with the second matching surface 314. and the direction X of the first axis is the axis direction of relative rotation of the first matching member 140 and the second matching member 300.

When an axial force is applied to the first matching member 140 and the second matching member 300, in the third state, the first matching member 140 and the second matching member 300 are generally not able to convert the axial force into an acting force for rotating causes the first matching member 140 relative to the second matching member 300. That is, the third state is a transitional state between the first state and the second state. The first matching surface 145 and the second matching surface 314 may be disposed as needed. Generally, in the rotatable stroke of the first matching member 140 and the second matching member 300, a stroke of the third state in which the first matching surface 145 abuts against the second matching surface 314 is shorter than a stroke of the first state in which the first curved surface 141 abuts against the third curved surface 311, and is shorter than a stroke of the second state in which the second curved surface 142 abuts against the fourth curved surface 312. The stroke of each state may be referenced by the rotation angle of the first matching member 140 and the second matching member 300 corresponding to each state. The shorter the stroke is, the smaller the rotation angle corresponding to the first matching member 140 and the second matching member 300 in this state is. The rotation angle corresponding to the first matching member 140 and the second matching member 300 may be understood as the angle at which the first matching member 140 and the second matching member 300 have rotated between a start point and an end point, where the position at which the first matching member 140 and the second matching member 300 rotate relatively to the state is the start point, and the position at which the first matching member 140 and the second matching member 300 rotate relatively out of the state is the end point.

In an embodiment, both the first curved surface 141 and the second curved surface 142 are disposed at a side of the first matching surface 145 away from the second matching member 300, and both the third curved surface 311 and the fourth curved surface 312 are disposed at a side of the second matching surface 314 away from the first matching member 140.

Figure 3:
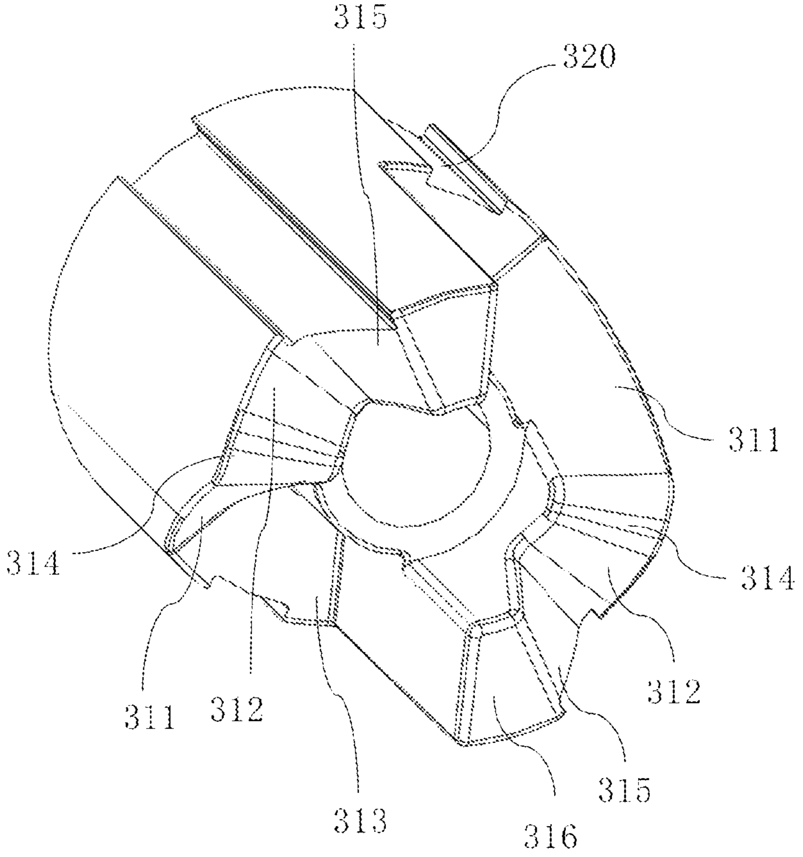
FIG. 3 schematically illustrates a schematic diagram of one perspective of a second matching member according to an embodiment of the present application.
Figure 4:
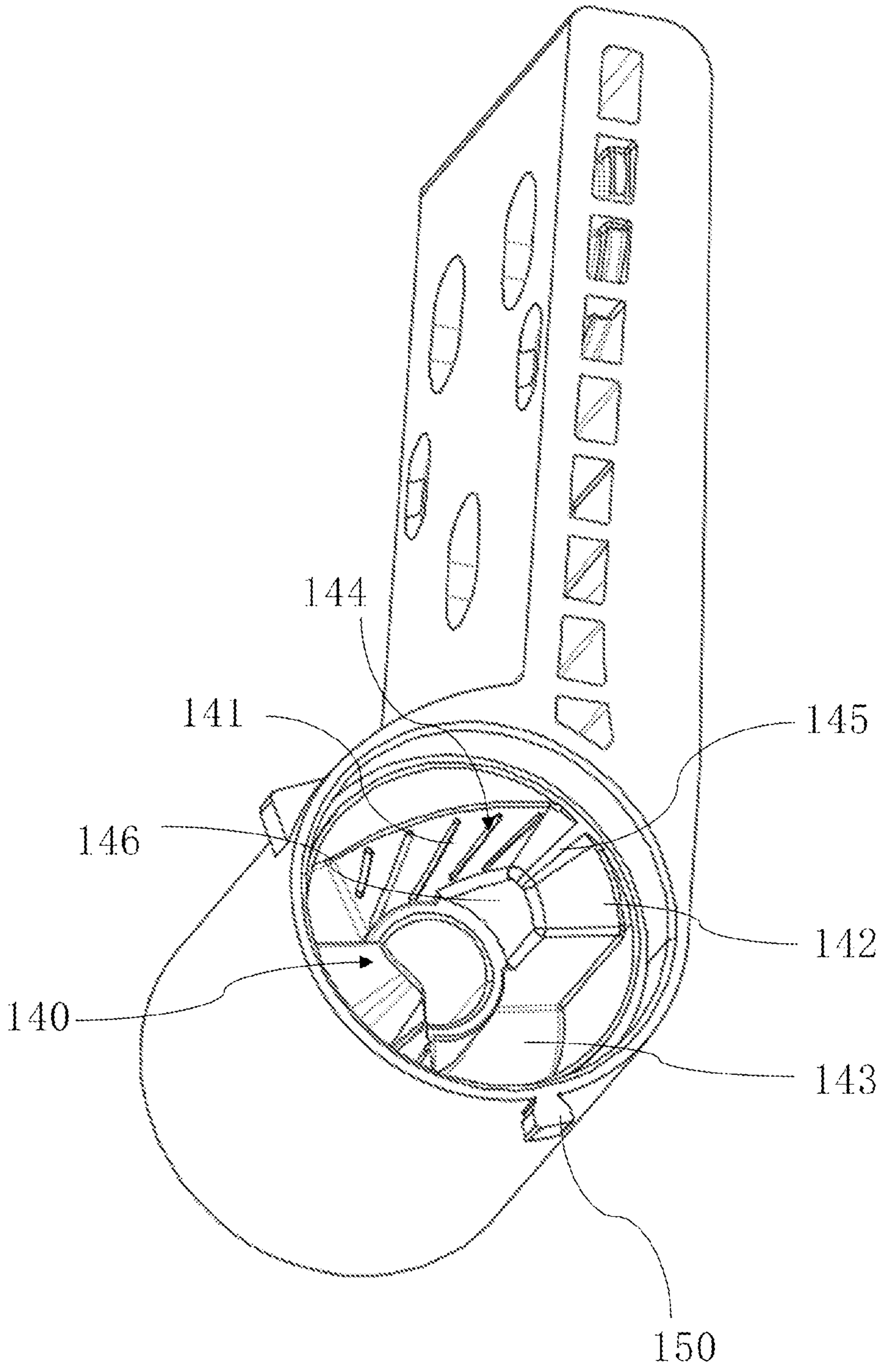
FIG. 4 schematically illustrates a schematic diagram of one perspective of a first hinge seat according to an embodiment of the present application.
Figure 5:
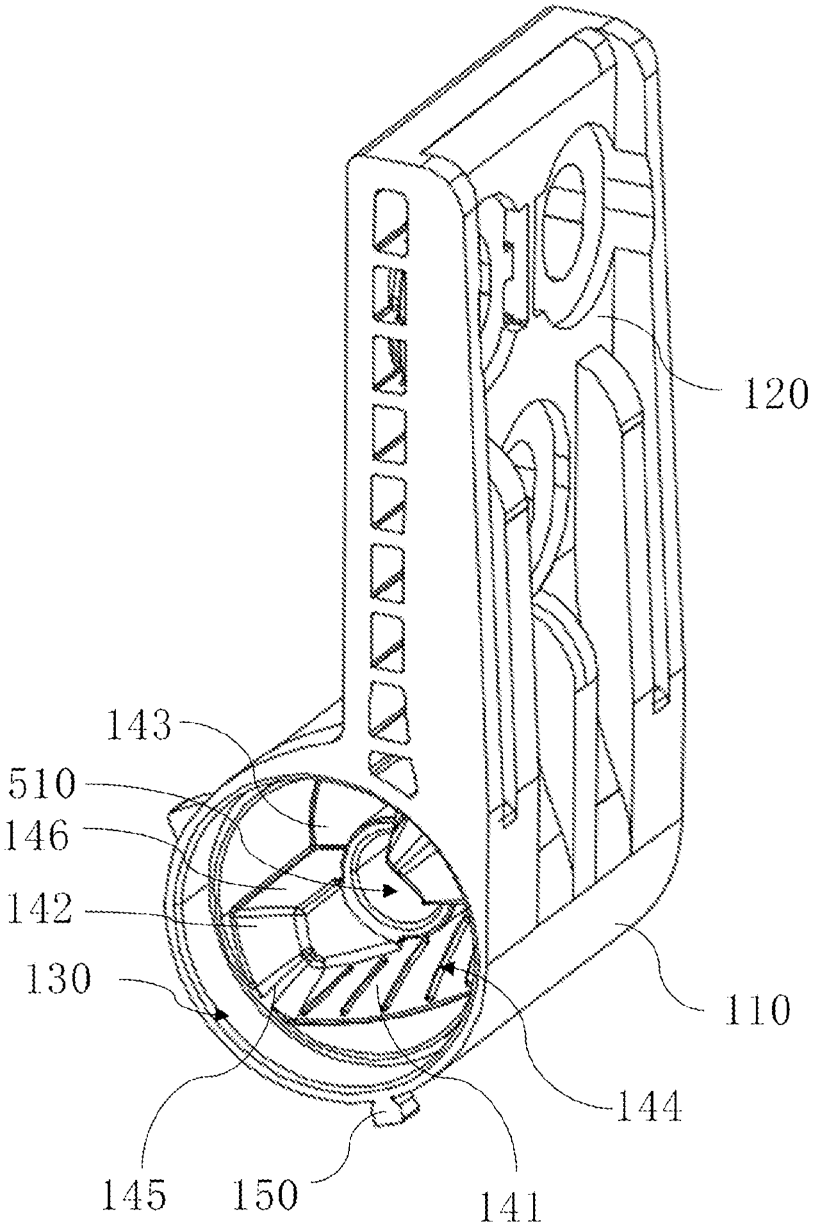
FIG. 5 schematically illustrates a schematic diagram of another perspective of a first hinge seat according to an embodiment of the present application.

As shown in FIG. 3 to FIG. 5, the first matching surface 145 protrudes towards the second matching member 300 relative to the first curved surface 141 and the second curved surface 142. In other words, the first surface 141 and the second surface 142 are concave facing away from the second matching member 300 relative to the first matching surface 145, and the first matching surface 145 acts as a bump portion. The second matching surface 314 protrudes towards the first matching member 140 relative to the third curved surface 311 and the fourth curved surface 312. In other words, the third curved surface 311 and the fourth curved surface 312 are concave away from the first matching member 140 relative to the second matching surface 314, and the second matching surface 314 acts as a bump portion.

In an embodiment, the first matching member 140 may also be provided with a stop surface 315 connected with an end of the second curved surface 142 away from the first matching surface 145. When the first matching member 140 and the second matching member 300 are rotated to a desired limit angle, for example, when the door body 30 is rotated to the lowest point or the door body 30 is rotated to the highest point, the stop surface 315 may act as a stop for rotation with a corresponding structure or a corresponding surface of the second matching member 300.

It may be understood that the second matching member 300 may also be provided with a stop surface 315 connected to the end of the fourth curved surface 312 away from the second matching surface 314. The stop surface 315 may also limit the range of the rotation angle of the first matching member 140 and the second matching member 300.

Figure 6:
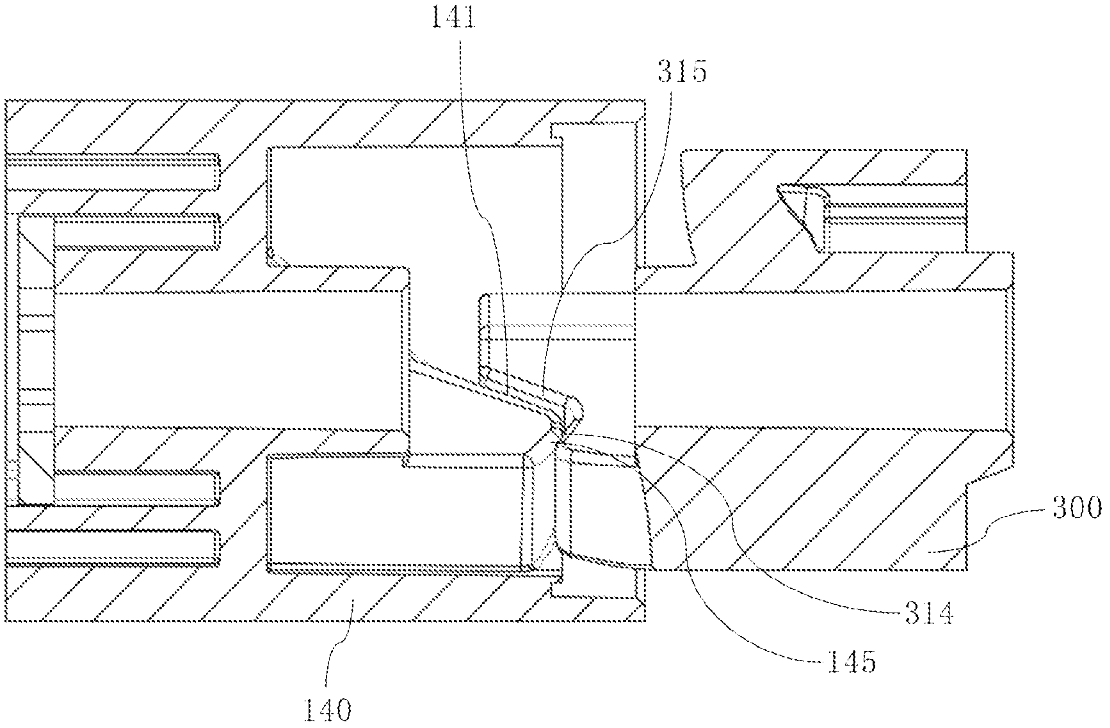
FIG. 6 schematically illustrates a schematic cross-sectional view showing that a first matching member and a second matching member are in a closed state on the door body according to an embodiment of the present application.

As shown in FIG. 6, in an embodiment, the first state is the opening state of the door body 30, and the second posture is the closed or nearly closed state of the door body 30. The first matching member 140 is connected to the door body 30 and rotates together with the door body 30, and the second matching member 300 is connected to the cabinet 20. The stop surface 315 may be disposed on the second matching member 300. When the door body 30 rotates until the first matching member 140 and the second matching member 300 are in the second state, the stop surface 315 may be matched with the third curved surface 311 to limit the first matching member 140 and the second matching member 300 from continuing to rotate towards the direction of closing the door body 30.

In some embodiments, as shown in FIG. 3 to FIG. 5, the first matching member 140 includes first protrusion portions 146 disposed at intervals along a circumferential direction, each first protrusion portion is provided with a first curved surface 141 and a second curved surface 142; the second matching member 300 includes second protrusion portions 316 disposed at intervals along a circumferential direction, each second protrusion portion is provided with a third curved surface 311 and a fourth curved surface 312, and the plurality of first protrusion portions 146 are provided in one-to-one correspondence with the plurality of second protrusion portions 316; and the circumferential direction is perpendicular to the direction X of the first axis.

In an embodiment, the hinge structure further includes a first hinge seat 100 and a second hinge seat 200. The first hinge seat 100 is connected to the first matching member 140, and the first hinge seat 100 rotates synchronously with the first matching member 140. The second hinge seat 200 is connected to the second matching member 300, and the second hinge seat 200 rotates synchronously with the second matching member 300. The first matching member 140 is slidably connected to the first hinge seat 100 in the direction X of the first axis, and/or the second matching member 300 is slidably connected to the second hinge seat 200 in the direction X of the first axis.

In practice, the first hinge seat 100 may be connected to the door body 30 of the opening and closing device, and the second hinge seat 200 may be connected to the cabinet 20 of the opening and closing device.

In an embodiment, the first hinge seat 100 is provided with a first accommodating cavity 130 extending in the direction X of the first axis. The second hinge seat 100 is provided with a second accommodating cavity 230 extending in the direction X of the first axis. The first accommodating cavity 130 is connected to the second accommodating cavity 230. The first matching member 140 is disposed inside the first accommodating cavity 130, and the second matching member 300 is disposed inside the second accommodating cavity 230.

For example, the first hinge seat 100 and the first matching member 140 may be integrated, and the second matching member 300 may be provided to be slidable in the direction X of the first axis within the second accommodating cavity 230.

The hinge assembly 10 further includes an elastic member 400 provided in the second accommodating cavity 230 and located at a side of the second matching member 300 away from the first matching member 140. The elastic member 400 may be compressed to apply an axial force, i.e., a thrusting force, to the second matching member 300 and the first matching member 140. In the first state, the force applied by the elastic member 400 to the second matching member 300 may cause the first matching member 140 to rotate in the first rotation direction relative to the second matching member 300; and in the second state, the force applied by the elastic member 400 to the second matching member 300 may cause the first matching member 140 to rotate in the opposite direction of the first rotation direction relative to the second matching member 300.

In one embodiment, a hinged assembly 10 includes a first hinge seat 100, a second hinge seat 200, a second matching member 300, and an elastic member 400. The first hinge seat 100 has a first matching member 140, and the first matching member 140 has a first curved surface 141 and a second curved surface 142. The second hinge seat 200 has a second accommodating cavity 230 extending along the direction X of the first axis, and the accommodating cavity 230 has a first opening at one end. The second matching member 300 is disposed inside the second accommodating cavity 230. The second matching member 300 and the second hinge seat 200 are fixed in the circumferential direction of the second accommodating cavity 230, and the second matching member 300 is slidable in the direction X of the first axis within the second accommodating cavity 230. The second matching member 300 has a second mating structure 310 having a third curved surface 311 and a fourth curved surface 312. The second matching structure 310 abuts against the first matching member 140 through the first opening. The elastic member 400 is disposed in the second accommodating cavity 230 and is located at an end of the second matching member 300 away from the first matching member 140, and the elastic member 400 applies a thrust force to the second matching member 300 that causes the second matching member 300 to move towards the first matching member 140.

The hinged assembly 10 has a first state and a second state, and the first hinge seat 100 may reciprocally rotate relative to the second hinge seat 200 around an axis extending in the direction X of the first axis in a predetermined angular range, causing the first matching member 140 to slide relative to the second matching structure 310, the hinged assembly 10 switches between the first and the second states. In the second state, the second curved surface 142 abuts against the fourth curved surface 312, and the elastic member 400 causes the first hinge seat 100 to have a torque to rotate relative to the second hinge seat 200 in the opposite direction of the first rotation direction; while in the first state, the first curved surface 141 abuts against the third curved surface 311, and the elastic member 400 causes the first hinge seat 100 to have a torque to rotate relative to the second hinge seat 200 in the first rotation direction. The first rotation direction is the same as the rotation direction of the first hinge seat 100 rotating relative to the second hinge seat 200 from the first state to the second state.

The first hinge seat 100 may be connected to the door body 30 of the opening and closing device, and the second hinge seat 200 may be connected to the cabinet 20 of the opening and closing device. During opening and closing of the door body 30, the second hinge seat 200 is fixedly disposed and the first hinge seat 100 rotates synchronously with the door body 30.

When the hinge assembly 10 is assembled to the opening and closing device, the direction X of the first axis may be configured in a direction parallel to the opening of the opening and closing device. When the opening and closing device is placed on a relatively flat floor, the direction X of the first axis may be understood with reference to a horizontal direction. The direction X of the first axis may be a left-right direction of the opening and closing device when the opening and closing apparatus is an upper opening door, the opening and closing side of the door body 30 is facing forwards, and the hinge assembly 10 is disposed on the rear side of the opening and closing device.

The hinge assembly 10 may be assembled in such a way that the first state of the hinge assembly 10 corresponds to a maximum opening state of the door body 30 of the opening and closing device and a state in which the door body 30 is opened at a larger angle, and the second state may correspond to a closed state of the door body 30 of the opening and closing device and a state in which the door body 30 is opened at a smaller angle. In this way, the first rotation direction is also the opening direction of the door body 30. In an embodiment, the maximum opening angle of the door body 30 corresponding to the second state may be in the range of 10 degrees to 45 degrees of rotation of the door body 30 from the closed state towards the opening direction, for example, the angle of opening of the door body 30 corresponding to the first state is in the range of 0 degrees to 15 degrees, 0 degrees to 20 degrees, 0 degrees to 21 degrees, 0 degrees to 25 degrees, 0 degrees to 30 degrees, 0 degrees to 35 degrees, 0 degrees to 40 degrees, or 0 degrees to 45 degrees, etc. The maximum opening angle of the door body 30 corresponding to the second state corresponds to the maximum angle of opening where the hinge assembly 10 may not buffer the closing of the door body 30 or provide assistance to the opening of the door body 30, in other words, when the door body 30 is opened from the closed state to a point exceeding the maximum angle of opening of the door body 30 corresponding to the second state, the first curved surface 141 abuts against the third curved surface 311, and the hinge assembly 10 may play an assisting role in the opening of the door body 30; before the door body 30 is rotated to the maximum opening angle of the door body 30 corresponding to the second state from the maximum opening state, the first curved surface 141 abuts against the third curved surface 311, and the hinge assembly 10 may play a buffering role in the closing of the door body 30.

In actual assembly, the elastic member 400 may be reasonably disposed according to the gravity of the door body 30 and the like, the torque generated by the hinge assembly 10 in the first state may be greater than the torque generated by the gravity of the door body 30, and the door body 30 may be suspended in the first state. When the door body 30 may suspend in the first state, the opening angle of the door body 30 corresponding to the first state is also the suspending angle of the door body 30. The lower limit of the suspending angle range is consistent with the opening angle of the door body 30 corresponding to the third state, that is, the opening angle of the door body 30 corresponding to the third state may be a threshold between suspending and being unable to suspend, and when it is greater than the maximum opening angle of the door body 30 corresponding to the third state, the door body 30 may suspend; and when it is less than the maximum opening angle of the door body 30 corresponding to the third state, the door body 30 is unable to suspend. The upper limit of the suspending angle range may be the same as the angle at which the door body 30 is opened to the maximum state.

The predetermined angular range of rotation of the first hinge seat 100 relative to the second hinge seat 200 corresponds to the opening degree of the door body 30, i.e., the angular range of rotation of the door body 30 opening to the maximum state from the closed state may be used as the predetermined angular range of rotation of the first hinge seat 100 and the second hinge seat 200. In this embodiment, the angle at which the door body 30 opens to the maximum state may be from 70 degrees to 90 degrees, for example, the angular range of rotation of the door body 30 may be from 0 degrees to 90 degrees, 0 degrees to 85 degrees, 0 degrees to 80 degrees, 0 degrees to 75 degrees, or 0 degrees to 70 degrees. In some techniques, the angle range of rotation of the door body 30 may be specifically set to 0 degrees to 80 degrees, where the door body 30 is closed at 0 degrees, and the door body 30 is opened to a maximum state at 80 degrees.

The second accommodating cavity 230 may be in the form of a cylinder with a circular cross-section.

The first matching member 140 and the second matching structure 310 may be ratchet-like structures. In an embodiment, the end of the first hinge seat 100 towards the second matching member 300 may be provided with a ratchet-like structure including first grooves disposed at intervals along a circumferential direction (for example, there may be two, three, or more, and on the basis of reasonable consideration of the space occupied and strength, two first grooves are provided generally). A first protruding portion 146 is formed on the sidewall of the first groove. A first curved surface 141, a first matching surface 145, and a second curved surface 142 are formed on the wall surface of the corresponding sidewall. The second matching member 300 is disposed in a generally cylindrical shape, and the end of the second matching member 300 facing the first hinge seat 100 may be provided with a ratchet-like structure including second grooves disposed at intervals in a circumferential direction. The second grooves and the first grooves are disposed in one-to-one correspondence. A second protruding portion 316 is formed on the sidewall of the second groove. A third curved surface 311, a fourth curved surface 312, and a second matching surface 314 are formed on the wall surface of the corresponding sidewall (i.e., on the top surface of the side wall of the second groove).

When the first hinge seat 100 rotates relative to the second hinge seat 200, the first matching member 140 and the second matching structure 310 may slide relative to each other, and different positions of the first matching member 140 may be matched with different positions of the second matching structure 310. When the door body 30 is closed, the hinge assembly 10 may be in a second state, the second curved surface 142 abuts against the fourth curved surface 312, and the elastic member 400 is in a compressed state, the thrust exerted by the elastic member 400 towards the second matching member 300 generates a torque in the radial tangential direction at the location where the second curved surface 142 abuts the fourth curved surface 312. The torque causes the door body 30 to have a tendency to rotate towards the closing direction, to assist in the closing of the door body 30. The door body 30 covers the cabinet 20 relying on gravity and the pressure generated by the spring. During the opening of the door body 30, the second surface 142 slides relative to the fourth curved surface 312, which gradually transforms into the case that the first matching surface 145 abuts against the second matching surface 314, and the first matching member 140 and the second matching member 300 do not have a relative rotational torque. As the door body 30 continues to open, the first curved surface 141 abuts against the third curved surface 311, and the first surface 141 slides relative to the third curved surface 311. The elastic member 400 gradually resets, maintaining the thrust force applied to the second matching member 300 while the thrust force becomes less gradually. When the first curved surface 141 abuts against the third curved surface 311, i.e., in the first state, the thrust force exerted by the elastic member 400 to the second matching member 300 generates a torque in the radial tangential direction at the location where the first curved surface 141 abuts the third curved surface 311. The torque causes the door body 30 to have a tendency to rotate in the direction of opening, to balance the gravity of the door body 30. When the door body 30 is opened to the maximum opening degree, the first curved surface 141 may still abut against the third curved surface 311, and the ratchet-like structure of the first hinge seat 100 may be engaged with the ratchet-like structure of the second matching member 300, i.e., the side wall of the first groove is inserted into the second groove, the side wall of the second groove is inserted into the first groove, the curved surface 142 may abut against the bottom surface of the second groove (the second bottom surface 313), and the fourth curved surface 312 may abut against the bottom surface of the first groove (the first bottom surface 143).

In an embodiment, the elastic member 400 is a spring, and the spring may always be in a compressed state after the hinge assembly 10 has been assembled and the spring may exert a thrust force to the second matching member 300.

According to the present embodiment, a hinge assembly 10 may be connected between a cabinet 20 (e.g., a freezer) and a door body 30 of an opening and closing device and the door body 30 is hinged to the cabinet 20, where the door body 30 may be connected to a first hinge seat 100, the cabinet 20 may be connected to a second hinge seat 200, and the rotation of the first hinge seat 100 relative to the second hinge seat 200 in the first rotation direction may be configured to open the door body 30. The hinge assembly 10 in this embodiment may convert the lateral force of the elastic member 400 (i.e., the spring) into a force in a direction consistent with the rotation direction of the first hinge seat 100 through the matching between the second matching member 300 and the first matching member 140, and ultimately realize the rotation of the hinge assembly 10 and the opening and closing of the door body 30. In an embodiment, during the opening of the door body 30, when the hinge assembly 10 is rotated to the first state, the elastic member 400 causes the first hinge seat 100 to have a torque that rotates in a first rotational direction relative to the second hinge seat 200, i.e., the thrust force exerted by the elastic member 400 to the second matching member 300 may assist in the opening of the door body 30 via the first curved surface 141 and the third curved surface 311. During the closing of the door body 30, the partial force of the torque on the hinge assembly 10 formed by the elastic member 400 may balance at least part of the gravitational force of the door body 30, alleviate the rapid falling of the door body 30, solve the problem of the violent collision between the door body 30 and the cabinet 20 caused by the rapid falling of the door body 30, and improving the user experience. When the hinge assembly 10 is rotated to the second state when the door body 30 is closed, the elastic member 400 causes the first hinge seat 100 to have a torque that rotates in the direction opposite to the first rotational direction relative to the second hinge seat 200, i.e., the thrust force applied by the elastic member 400 to the second matching member 300 may assist the closing of the door body 30 through the second curved surface 142 and the fourth curved surface 312, and the door body 30 may have better closing sealing and be easy to assemble, the space occupied by the hinge assembly 10 is reduced, the number of opening and closing devices that may be loaded on the transportation tool is increased, and the transportation cost of the opening and closing device is decreased.

Furthermore, both the elastic member 400 and the second matching member 300 are disposed in the second accommodating cavity 230 of the second hinge seat 200. The elastic member 400 is a built-in member, which reduces the risk that the hinge assembly 10 pinches fingers of the user or the assembly personnel, and improves safety.

In the present embodiment, the axial force of the elastic member 400 in the direction X of the first axis may be converted into a relatively large torque for rotation of the first hinge seat 100 through the first matching member 140 and the second matching structure 310, and the required elastic force of the elastic member 400 is reduced. When the elastic member 400 is a spring, the wire diameter of the spring may be about 2.5 millimeters, and the outer diameter of the overall spring may be no greater than 16 millimeters, for example, it may be 15.8 millimeters. As the size of the elastic member 400 is decreased, the impact of the hinge assembly 10 on the space occupancy of the opening and closing device may be decreased, i.e., the size of the protrusion of the rear side of the hinge assembly 10 from the side wall of the cabinet 20 is decreased. Combined with the reasonable design of the cabinet 20, the size of the hinge assembly 10 protruding out of the side wall of the cabinet 20 may be no greater than 10 millimeters when the hinge assembly 10 of this embodiment is mounted to the opening and closing device, which enhances the overall loading volume of the product and saves the transportation cost.

It should be noted that in the present embodiment, the first hinge seat 100 is connected to the door body 30 of the opening and closing device, and the second hinge seat 200 is connected to the cabinet 20 of the opening and closing device. However, during actually assembled, the first hinge seat 100 may be connected to the cabinet 20 of the opening and closing device and the second hinge seat 200 may be connected to the door body 30 of the opening and closing device as required. That is, the first hinge seat 100 is fixedly disposed relative to the cabinet 20, and the second hinge seat 200 rotates together with the door body 30 synchronously. The first hinge seat 100 is fixed, and according to the relativity of movement, the rotation of the first hinge seat 100 relative to the second hinge seat 200 may be realized by the rotation of the second hinge seat 200.

According to some embodiments of the present application, in some implementations, as shown in FIG. 1, FIG. 2, FIG. 4 and FIG. 5, a first hinge seat 100 includes a first lock plate 120 and a first hinge portion 110. The first lock plate 120 is integrated with the first hinge portion 110, and a first matching member 140 is disposed at the first hinge portion 110. The second hinge seat 200 includes a second lock plate and a second hinge portion 210. The second lock plate is integrated with the second hinging portion 210, and the second accommodating cavity 230 is provided with the second hinging portion 210. The first hinge portion 110 and the second hinge portion 210 may be rotatably connected. The first lock plate 120 is connected to the door body 30 of the opening and closing device, and the second lock plate is connected to the cabinet 20 of the opening and closing device.

The first hinge seat 100 may be injection-molded, the first lock plate 120 and the first hinge portion 110 are formed through injection molding. The second hinge seat 200 may be injection-molded, and the second lock plate and the second hinge portion 210 are formed through injection molding.

In an embodiment, the first lock plate 120 may be provided with one or more first mounting holes 121 used for being matched with a fixing member to fix the first lock plate 120 on the door body 30. The fixing member may be a bolt, a screw, or the like. In one embodiment, the fixing member is a bolt.

In an embodiment, the second lock plate includes a first sub-lock plate 221 and a second sub-lock plate 222, where the second sub-lock plate 222 is provided with one or more second mounting holes 223 used for being matched with a fixing member to fix the second sub-lock plate 222 on the cabinet 20. The fixing member may be a bolt, a screw, or the like. The first sub-lock plate 221 is fixedly connected to the second hinge portion 210 and is located on the side of the second sub-lock plate 222 close to the door body 30. The first sub-lock plate 221 is inserted into and fixed with the cabinet 20, and may be inserted into and matched with the trench 105 disposed horizontally or vertically in the cabinet 20. The first sub-lock plate 221 is connected to the cabinet 20 through plugging, and in the process of opening the door body 30, i.e., when the first hinge seat 100 rotates, the first sub-lock plate 221 is the main member to withstand the torque, while the second sub-lock plate 222 is fixed through the second mounting hole, which may strengthen the fixation of the second hinge seat 200 with the door body 30 and prevent the second hinge seat 200 from moving. Both the first sub-lock plate 221 and the second sub-lock plate 222 may be integrated with the second hinge portion 210.

Figure 2:
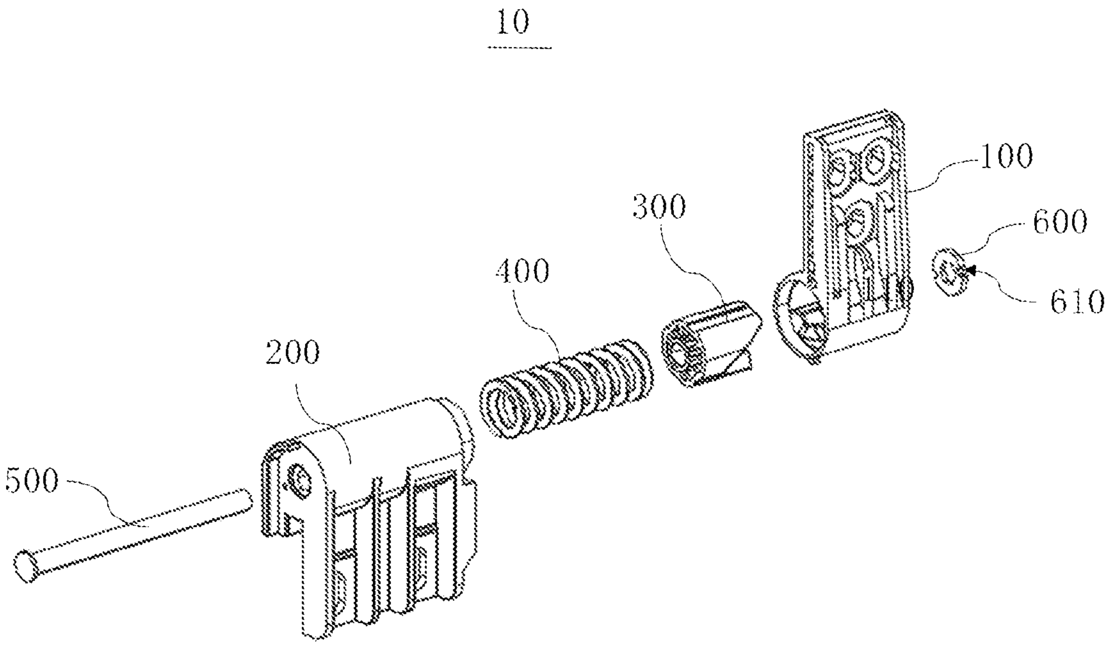
FIG. 2 schematically illustrates an exploded schematic diagram of a hinge according to an embodiment of the present application.
Figure 16:
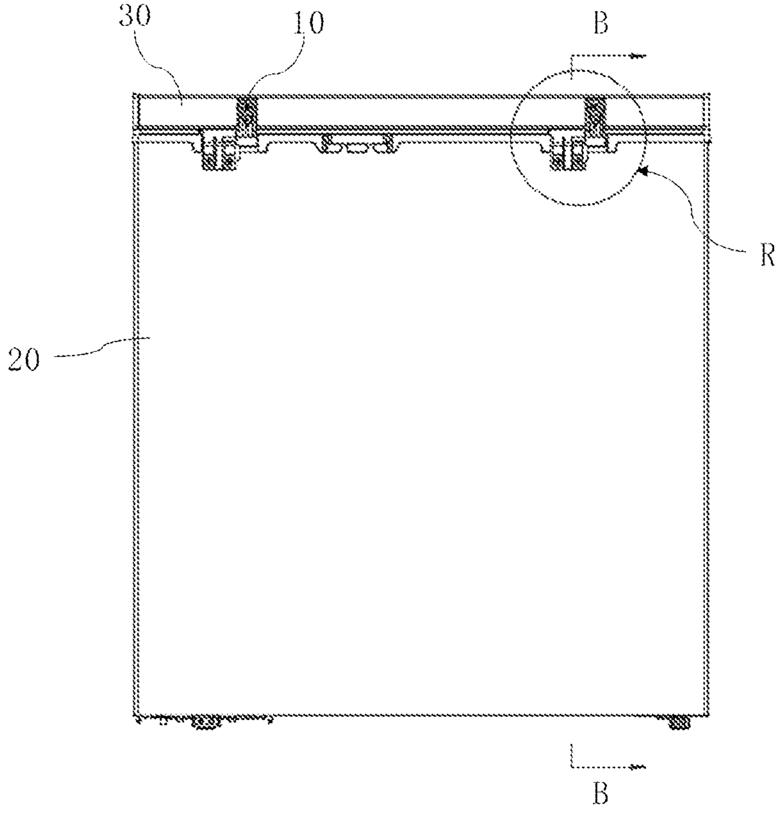
FIG. 16 schematically illustrates a rear view of an opening and closing device according to an embodiment of the present application.
Figure 17:
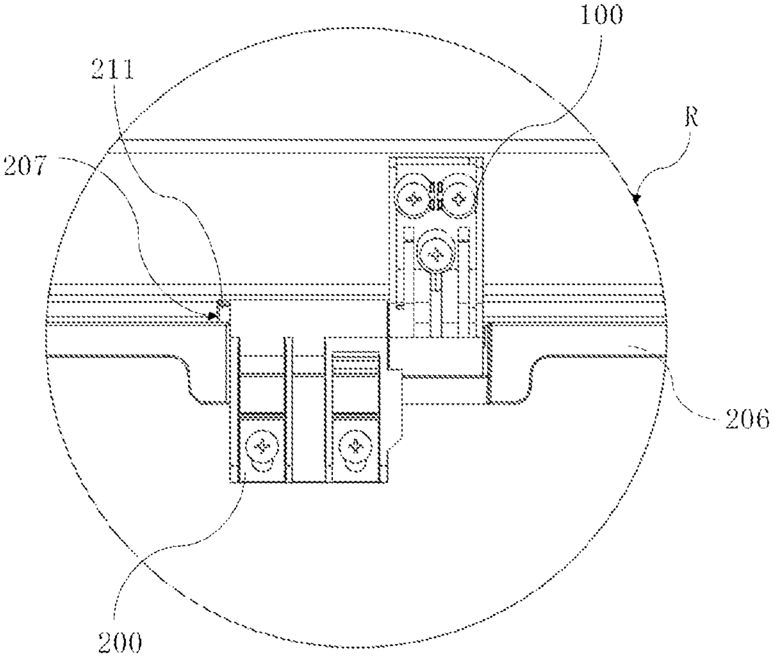
FIG. 17 schematically illustrates an enlarged schematic diagram of the R-portion of FIG. 16.
Figure 18:
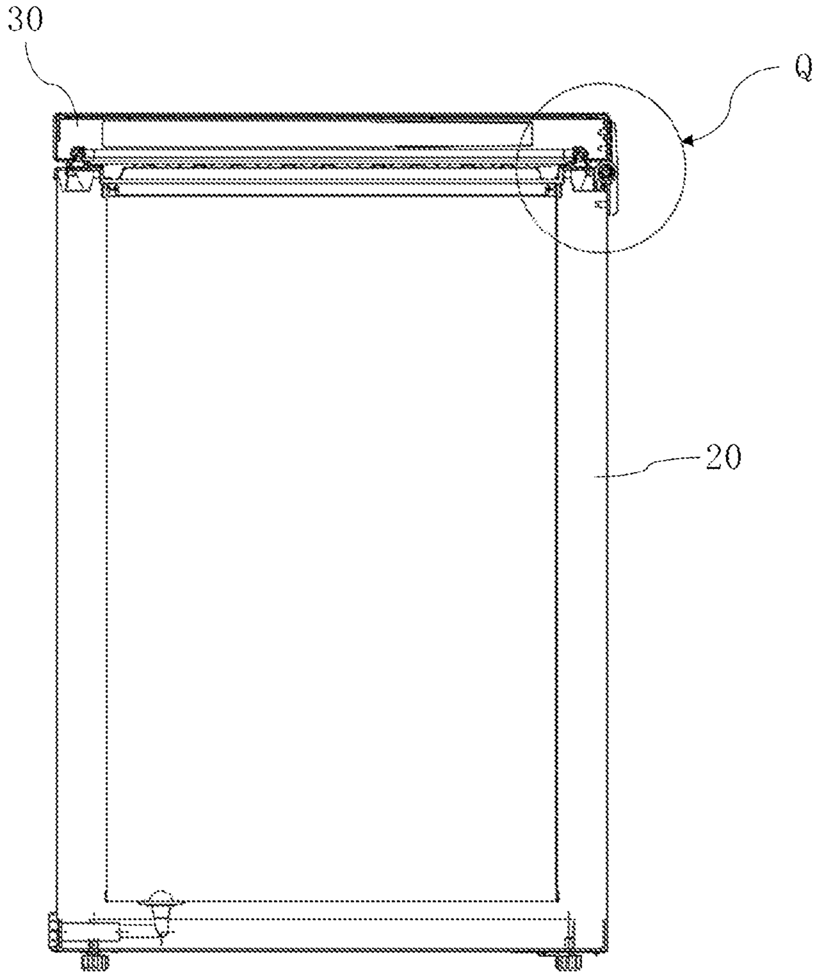
FIG. 18 schematically illustrate a cross-sectional view of FIG. 16 in the direction of B-B.
Figure 19:
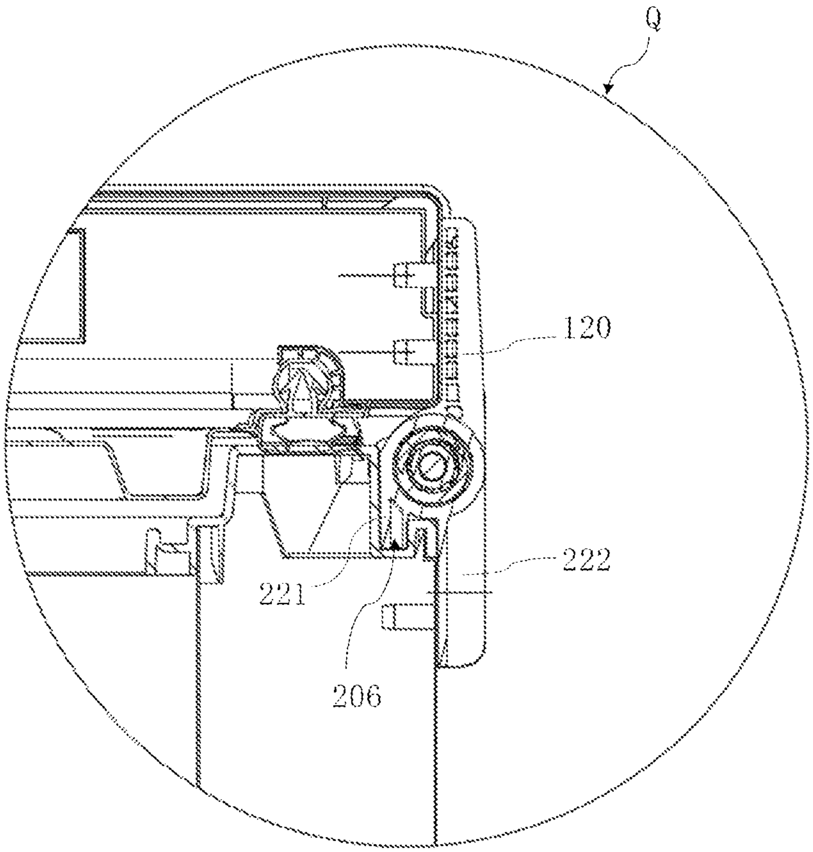
FIG. 19 schematically illustrates an enlarged schematic diagram of the Q-portion of FIG. 18.

In one embodiment, as shown in FIG. 1, FIG. 2, and FIG. 4 in combination with FIG. 16 and FIG. 17, the first lock plate 120 has a door body mounting surface facing the door body 30. The door body mounting surface may be a flat surface, and the first lock plate 120 is attached to an end surface of the door body 30 through the door body mounting surface, and a bolt or screw passes through the first mounting hole 121 and is fixedly connected to the door body 30 to fixedly connect the first lock plate 120 to the door body 30. The second sub-lock plate 222 has a cabinet mounting surface facing the cabinet 20 and the cabinet mounting surface may be a flat surface. The second sub-lock plate 222 is attached to an outer side surface of the cabinet 20 through the cabinet mounting surface, and the bolt or screw is fixedly connected through the second mounting hole 223 to a side wall of the cabinet 20 (when the second sub-lock plate 222 is attached to a rear side surface, the side wall is a rear side wall), and the second sub-lock plate 222 is fixedly connected to the cabinet 20. In an embodiment, the hinge assembly 10 may be disposed on the rear side of the opening and closing device. The first lock plate 120 may be attached and fixedly connected to the rear end surface of the door body 30, and the second sub-lock plate 222 may be attached and fixedly connected to the rear side surface of the cabinet 20. In the closed state of the door body 30, both the first lock plate 120 and the second sub-lock plate 222 are disposed substantially in a vertical direction, i.e., the angle between the first lock plate 120 and the second sub-lock plate 222 is 180 degrees or substantially 180 degrees. During the opening of the door body 30, the first lock plate 120 and the first hinge portion 110 synchronously rotate backward. An included angle between the first lock plate 120 and the second sub-lock plate 222 on the side facing the opening and closing device is increased, and an included angle between the first lock plate 120 and the second sub-lock plate 222 on the side facing away from the opening and closing device (this angle and the angle between the first lock plate 120 and the second sub-lock plate 222 on the side facing the opening and closing device are mutual circumferences) is decreased.

In some embodiments, as shown in FIG. 1 and FIG. 2, the first lock plate 120 may be provided with three first mounting holes 121, where two first mounting holes 121 are disposed at intervals and aligned along the direction X of the first axis, and one first mounting hole 121 is disposed on the side of the two first mounting holes 121 close to the second sub-lock plate 222, i.e., the three first mounting holes 121 may be arranged in a triangular pattern in sequence. The second sub-lock plate 222 may be provided with two second mounting holes 223 disposed at intervals and aligned along the direction X of the first axis.

In an embodiment, reinforcing ribs 160 may be disposed on the first lock plate 120 and the second sub-lock plate 222. In one embodiment, the first lock plate 120 is provided with one or more reinforcing ribs 160 on a surface opposite to the mounting surface of the door body 30, and the second sub-lock plate 222 is provided with one or more reinforcing ribs 160 on a surface opposite to the mounting surface of the cabinet 20. The reinforcing ribs 160 may increase the strength of the first lock plate 120 and/or the second sub-lock plate 222 and prolong the service life of the first lock plate 120 and the second sub-lock plate 222. The reinforcing ribs 160 may be integrated with the corresponding lock plates.

In an embodiment, in order to limit the maximum opening state of the door body 30, i.e., to limit the opening degree of the door body 30, the first lock plate 120 and the second sub-lock plate 222 may be provided with corresponding stop structures. For example, the first lock plate 120 is provided with a first stop 122 on a side close to the second hinge portion 210, and the second sub-lock plate 222 is provided with a second stop 224 on a side close to the first hinge portion 110, and the first stop 122 is matched with the second stop 224 to limit the maximum angle of rotation of the first hinge seat 100 and the second hinge portion 210 along the first rotation direction.

The first stop 122 may be integrated with the first lock plate 120, and the second stop 224 may be integrated with the second sub-lock plate 222. The first stop 122 may be disposed on a surface of the first lock plate 120 opposite to the door body mounting surface, and the second stop 224 may be disposed on an end surface of the second sub-lock plate 222 connected to a cabinet attachment surface.

According to some embodiments of the present application, the first hinge portion 110 is provided with a first accommodating cavity 130. A second opening of the first accommodating cavity 130 is provided opposite to the first opening and communicates with the first opening, and the first matching member 140 is provided within the first accommodating cavity 130. An end of the first hinge portion 110 with the second opening is connected in a sealed manner to an end of the second hinge portion 210 with the first opening.

The first accommodating cavity 130 may be in a shape of a cylinder with a circular cross section.

The first matching member 140 and the second matching structure 310 are matched to slide together, and in order to improve the smoothness of sliding and reduce the wear of the first matching member 140 and the second matching structure 310, lubricating oil may be added between the first matching member 140 and the second matching structure 310. The first hinge portion 110 is provided with a first accommodating cavity 130, and the first accommodating cavity 130 is connected to in a sealed manner and communicates with the second accommodating cavity 230, and the first matching member 140 and the second matching structure 310 may be in a relatively sealed environment, which ensures long-term use and storage of the lubricating oil.

Figure 9:
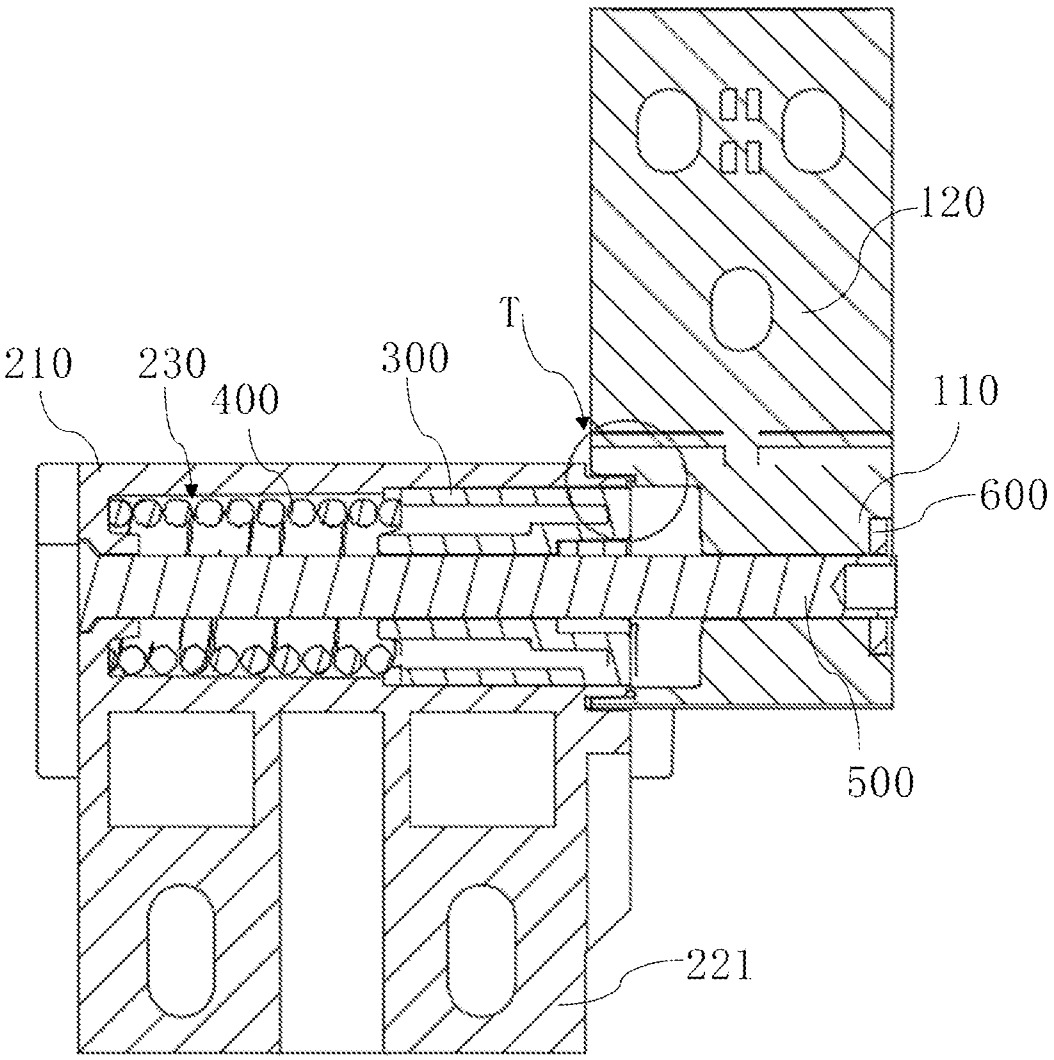
FIG. 9 schematically illustrates a schematic cross-sectional view of a hinge in another direction according to an embodiment of the present application.
Figure 10:
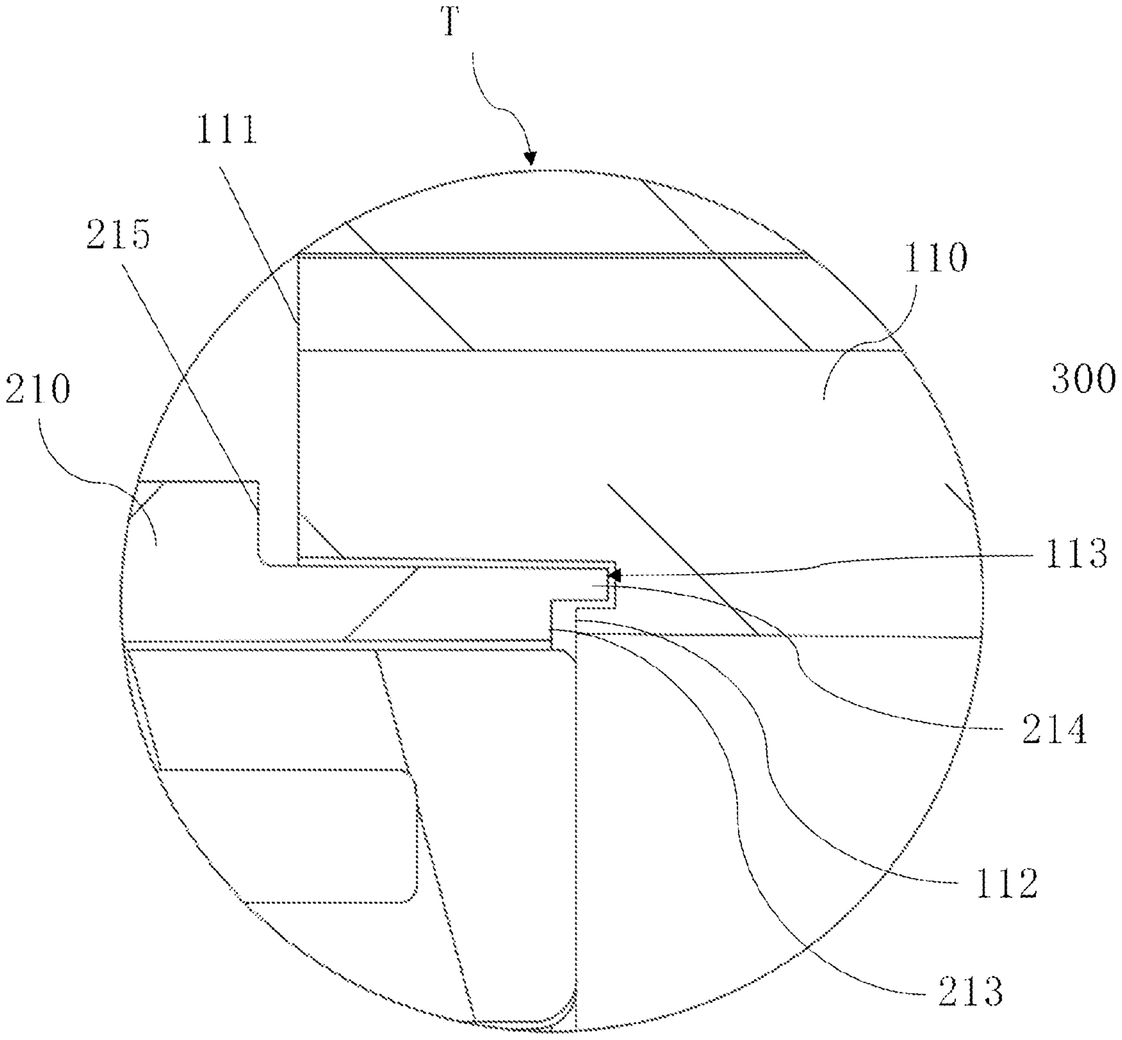
FIG. 10 schematically illustrates an enlarged diagram of the T-portion of FIG. 7.
Figure 11:
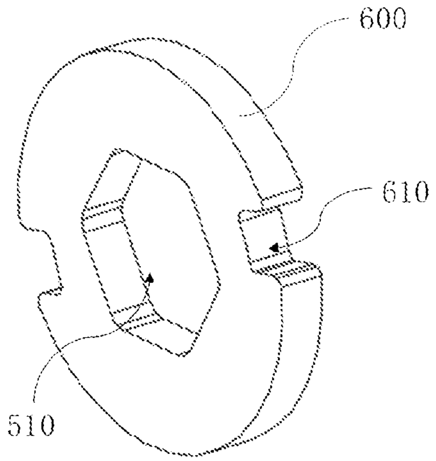
FIG. 11 schematically illustrates a schematic diagram of a shim according to an embodiment of the present application.
Figure 12:
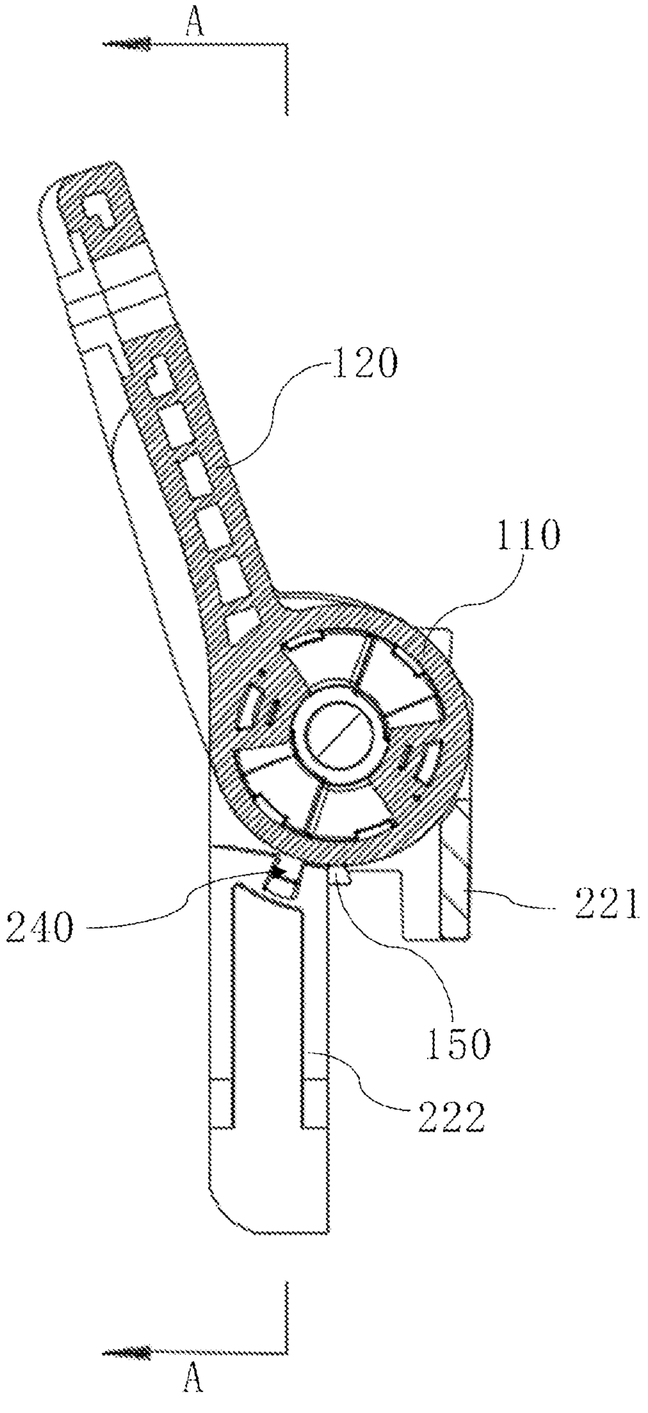
FIG. 12 schematically illustrates a schematic cross-sectional view of a hinge in one direction according to an embodiment of the present application.
Figure 13:
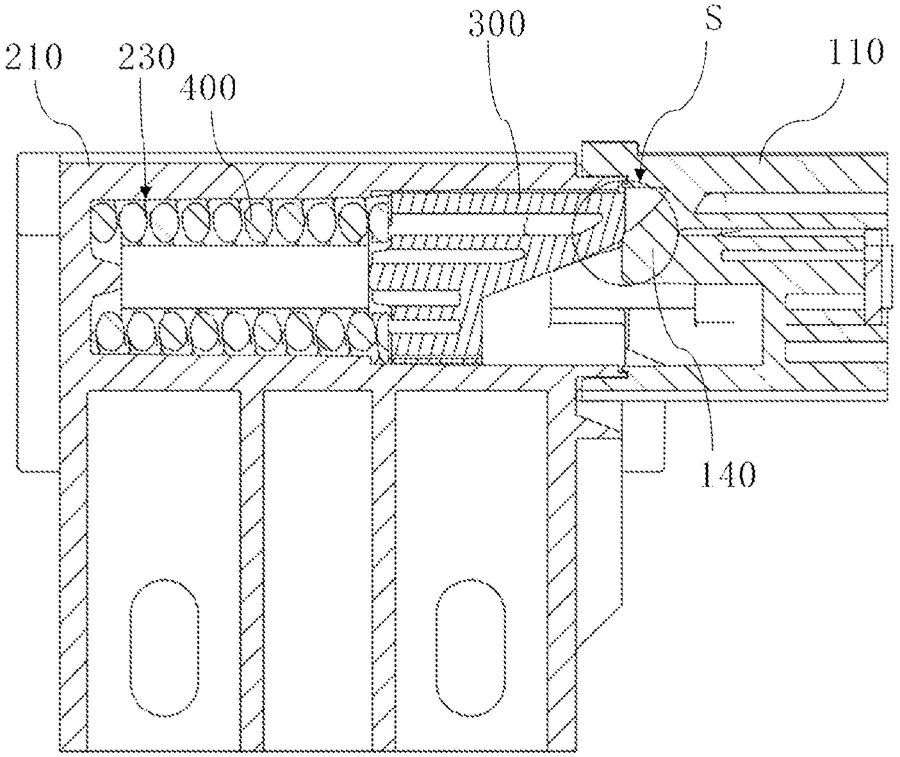
FIG. 13 schematically illustrates a cross-sectional view of FIG. 12 in the direction of A-A.
Figure 14:
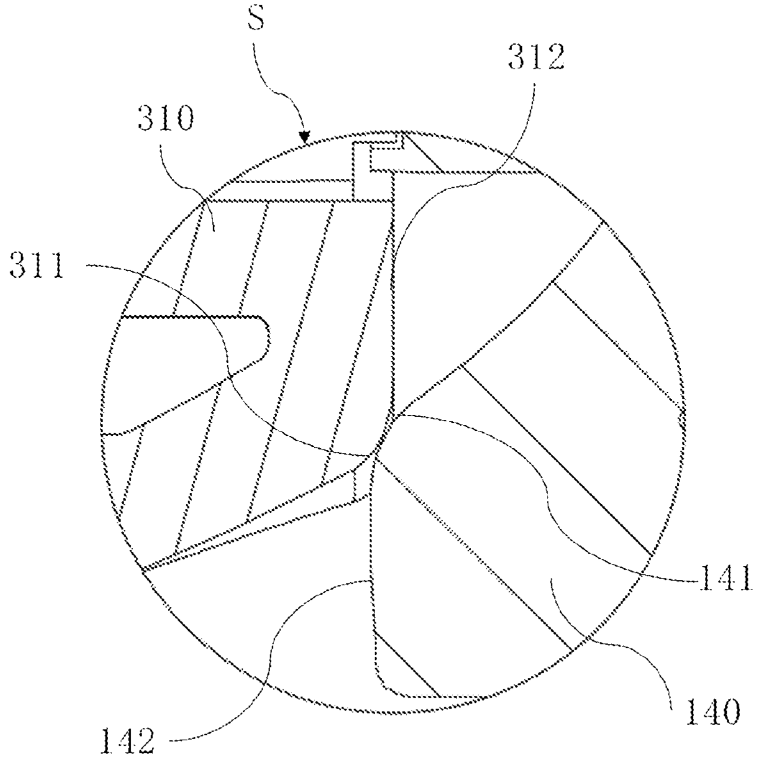
FIG. 14 schematically illustrates an enlarged schematic diagram of the S-portion of FIG. 13.
Figure 15:
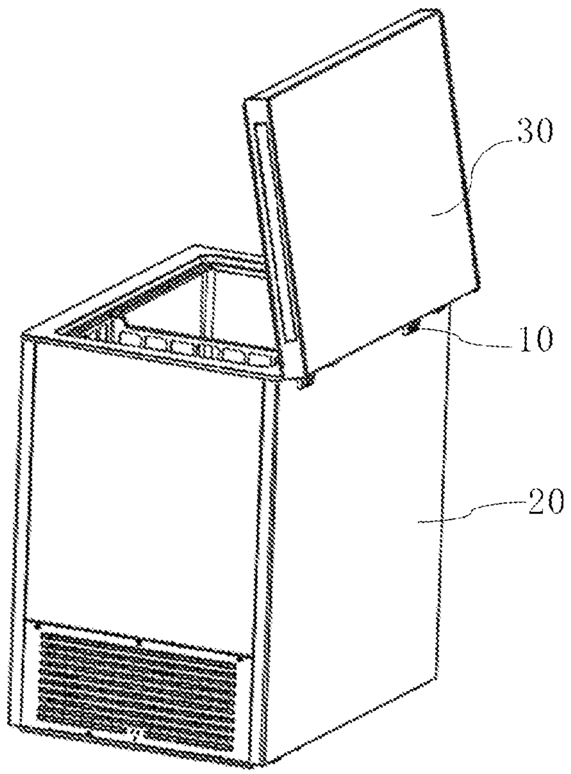
FIG. 15 schematically illustrates a schematic diagram of an opening and closing device according to an embodiment of the present application.

As shown in FIG. 9 and FIG. 10, in an implementation, an end surface of the second hinge portion 210 with the first opening is provided with an annular first connecting surface 215 and an annular boss 213 protruding relative to the first connecting surface 215, and the annular boss 213 is located at the inner side of the first connecting surface 215 in the radial direction. An end surface of the first hinge portion 110 with the second opening is provided with an annular second connecting surface 111 and an annular step 112 recessed relative to the second connecting surface 111, and the second step is located at the inner side of the second connecting surface 111 in the radial direction. After the first hinge portion 110 is connected to the second hinge portion 210, the first connecting surface 215 is disposed opposite to the second connecting surface 111, and the annular boss 213 is disposed in correspondence with the recessed annular step 112, and the annular boss 213 and the annular step 112 may be provided with an annular groove 113 and an annular protrusion 214 matched with each other. For example, annular boss 213 may be provided with the annular protrusion 214, the annular step 112 may be provided with the annular groove 113, and the annular groove 113 is plugged and matched with the annular protrusion 214.

It may be understood that by the matching structure of the annular protrusion 214 on the annular boss 213 and the annular groove 113 on the annular step 112, an oil-receiving structure, i.e., a sealing groove structure, may be formed on the end surface of the first hinge portion 110 connected to the second hinge portion 210, which reduces the risk of leaking the lubricating oil from the connecting end surface of the first hinge portion 110 and the second hinge portion 210.

According to some embodiments of the present application, as shown in FIG. 4, at least one of the second curved surface 142, the fourth curved surface 312, the first curved surface 141 or the third curved surface 311 may be provided with an oil storage tank 144.

For example, the oil storage tank 144 may be disposed on any one of the second curved surface 142, the fourth curved surface 312, the first curved surface 141, and the third curved surface 311; or the oil storage tank 144 may be disposed on two or three or four of the second curved surface 142, the fourth curved surface 312, the first curved surface 141, and the third curved surface 311.

The oil storage tank 144 is a groove formed on the corresponding surface, and one or more oil storage tanks 144 may be disposed on the same matching surface or the same curved surface.

As shown in FIG. 4, in one embodiment of the present application, the oil storage tank 144 may be disposed at the sliding structure of the first matching member 140 of the first hinge seat 100, i.e., the oil storage tank 144 may be disposed on the first curved surface 141.

The oil storage tank 144 may be used to store a part of the lubricating oil. When the first hinge seat 100 rotates relative to the second hinge seat 200, the lubricating oil may be stored in the oil storage tank 144 to reduce wear of the first matching member 140 and the second matching structure 310.

According to some embodiments of the present application, at least one of the first hinge portion 110 or the second hinge portion 210 is provided with a relief hole 250, and the relief hole 250 communicates with the second accommodating cavity 230. When the first hinge portion 110 is provided with the relief hole 250, the relief hole 250 disposed on the first hinge portion 110 may communicate with the first accommodating cavity 130. The relief hole 250 also communicates with the second accommodating cavity 230 since the first accommodating cavity 130 communicates with the second accommodating cavity 230.

Figure 7:
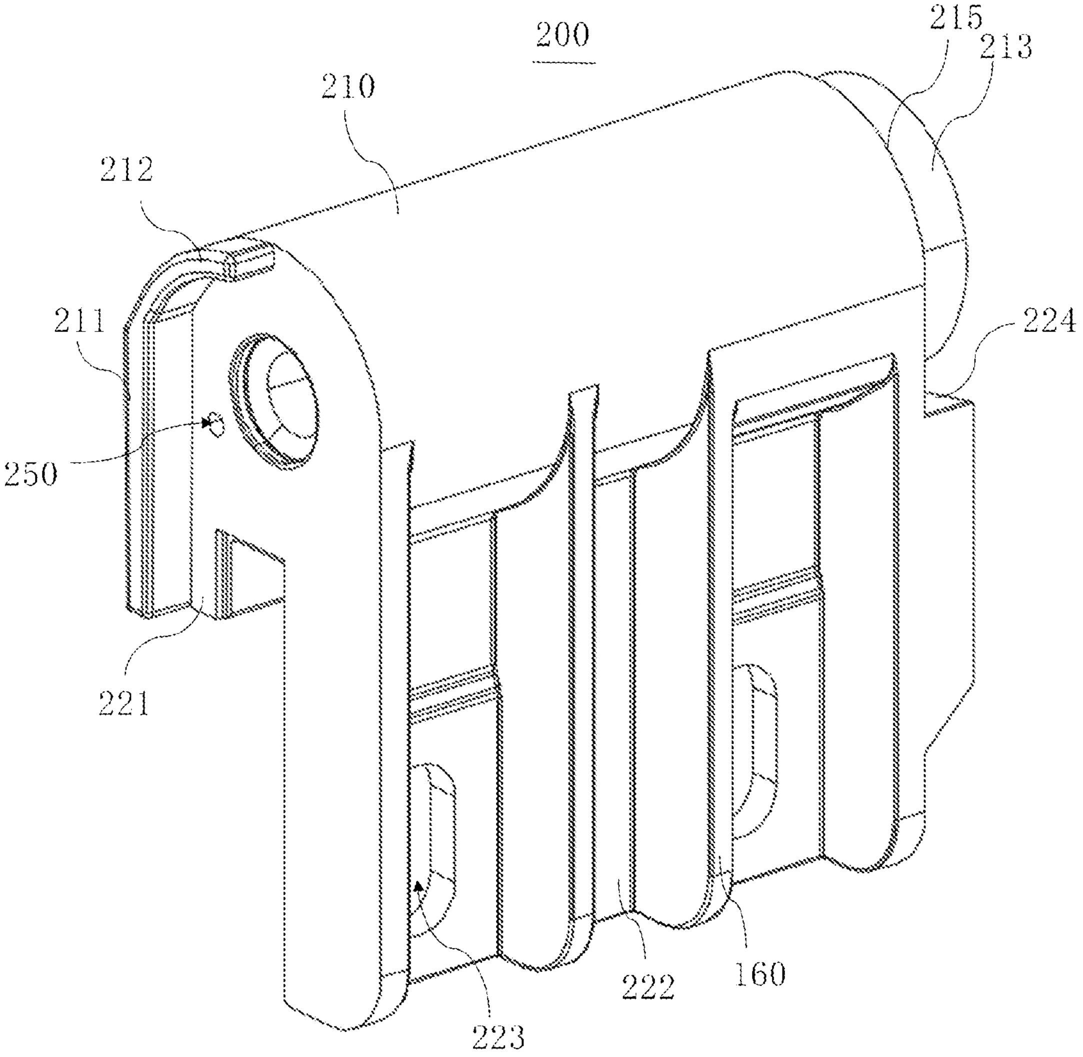
FIG. 7 schematically illustrates a schematic diagram of a perspective of a second hinge seat according to an embodiment of the present application.
Figure 8:
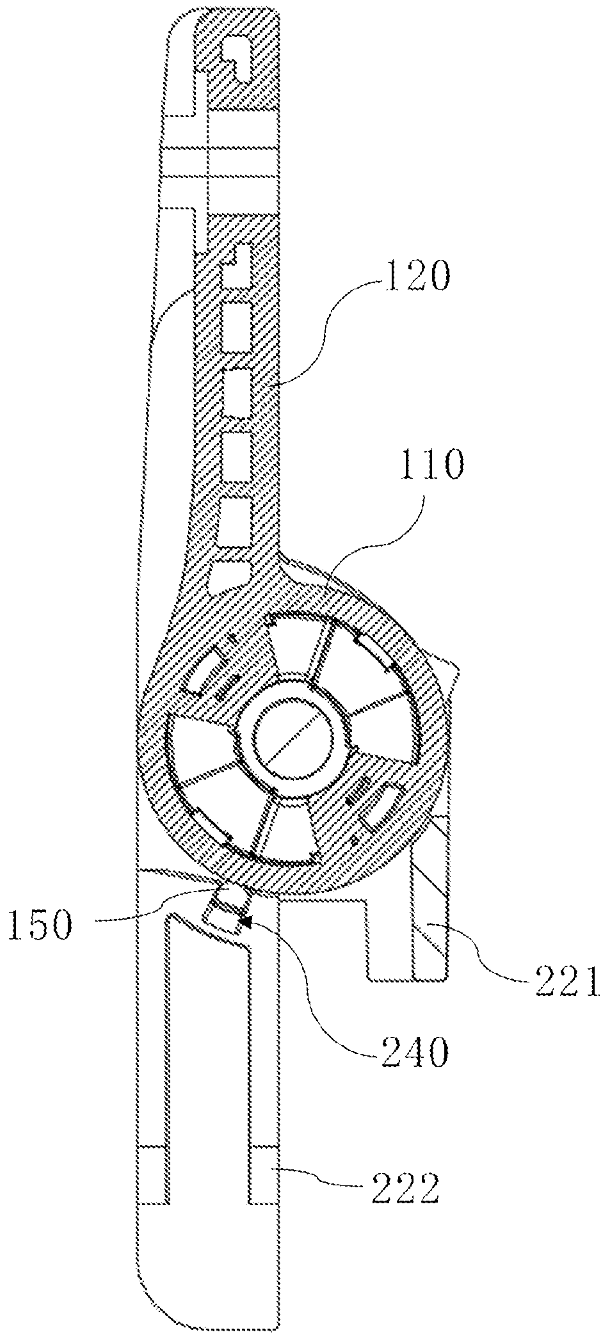
FIG. 8 schematically illustrates a schematic cross-sectional view of a hinge in one direction according to an embodiment of the present application.

In an embodiment, as shown in FIG. 1 and FIG. 7, the end of the second hinge portion 210 away from the first opening may also be provided with a relief hole 250, and the relief hole 250 communicates with the second accommodating cavity 230.

When the hinge assembly 10 rotates, the lubricating oil inside the hinge assembly 10, i.e., inside the second accommodating cavity 230 and the accommodating groove, is squeezed, and the internal space is compressed, resulting in increase in local pressure. By providing the relief hole 250, the oil leakage caused by the imbalance of the internal air pressure may be avoided.

It should be noted that the relief hole 250 should be disposed above the oil level of the lubricating oil that may be stored in the second accommodating cavity 230 to reduce the risk of leaking lubricating oil from relief hole 250.

According to some embodiments of the present application, the first hinge seat 100 may be provided with a first positioning portion 150, and the second hinge seat 200 may be provided with a second positioning portion 240. The second positioning portion 240 may be matchable with the first positioning portion 150 to position the first hinge seat 100 and the second hinge seat 200 at an initial mounting angle. The first positioning portion 150 may be dis-connectable from the first hinge seat 100, and/or the second positioning portion 240 may be dis-connectable from the second hinge seat 200.

The initial mounting angle is a positioning angle during the assembly process of the first hinge seat 100 and the second hinge seat 200. Generally, after the first hinge seat 100 and the second hinge seat 200 are assembled, the hinge assembly 10 is connected to the opening and closing device. In order to facilitate the connection of the hinge assembly 10 with the door body 30 and the cabinet 20 of the opening and closing device, an angle between the first hinge seat 100 and the second hinge seat 200 that facilitates the mounting of the first hinge seat 100 to the door body 30, and the mounting of the second hinge seat 200 to the cabinet 20, may be taken as the initial mounting angle. In this embodiment, when the door body 30 is in the closed state, it is most convenient to assemble the hinge seat and the opening and closing device, and no torque is applied between the first hinge seat 100 and the second hinge seat 200. The initial mounting angle may be approximately 180 degrees between the first lock plate 120 of the first hinge seat 100 and the second sub-lock plate 222 of the second hinge seat 200.

The first positioning portion 150 and the second positioning portion 240 are matched to form a self-locking structure of the hinge assembly 10, the first hinge seat 100 and the second hinge seat 200 are temporarily fixed, the first hinge seat 100 may not rotate relative to the second hinge seat 200, and may position a relative mounting position between the first hinge seat 100 and the second hinge seat 200 to reduce the risk of mounting the first hinge seat 100 and the second hinge seat 200 by mistake.

The first positioning portion 150 may be dis-connectable from the first hinge seat 100, which may be understood that the connection between the first positioning portion 150 and the first hinge seat 100 may be released, and the disconnection may be destructive that may not be recovered or detachable. Similarly, the second positioning portion 240 may be dis-connectable from the second hinge seat 200, which may be understood that the connection between the second positioning portion 240 and the second hinge seat 200 may be released, and the disconnection may be destructive that may not be recovered or detachable.

In one embodiment, one of the first positioning portion 150 and the second positioning portion 240 is a groove structure and the other thereof is a protrusion. Taking the first positioning portion 150 as a protrusion and the second positioning portion 240 as a groove as an example, when the hinge assembly 10 is assembled, the protruding structure of the first hinge seat 100 is assembled into the groove structure of the second hinge seat 200 to prevent the hinge assembly 10 from rotating. Meanwhile, the root of the protruding structure is thinned. After the hinge assembly 10 is mounted for the first time, with the opening of the door body 30, due to the protruding structure being stuck in the groove, the protruding structure is broken from the root to disconnect the first hinge seat 100 from the second hinge seat 200 in the circumferential direction, and rotate the hinge assembly 10.

Furthermore, the groove structure may also be provided with a slope to allow the broken protruding structure to flow out of the groove structure along the slope, which prevents the protruding structure from leaving in the hinge assembly 10.

According to some embodiments, an outer circumferential wall of the second matching member 300 may be provided with a first guiding structure 320 extending in the direction X of the first axis, and the second accommodating cavity 230 of the second hinge seat 200 may be provided with a second guiding structure 231 extending in the direction X of the first axis. The first guiding structure 320 and the second guiding structure 231 are matched to fix the second matching member 300 and the second hinge seat 200 relative to each other in a circumferential direction of the second accommodating cavity 230, and to move the second matching member 300 in the direction X of the first axis.

The first guiding structure 320 and the second guiding structure 231 may be a matching of raised strips with recessed grooves. In this embodiment, an outer circumferential wall of the second matching member 300 is provided with recessed grooves, and an inner wall of the second accommodating cavity 230 is provided with raised strips, and the raised strips are disposed in the recessed grooves, and the raised strips and the recessed grooves may slide relative to each other in the direction X of the first axis. The raised strips may be in one-to-one correspondence with the recessed grooves, and for example, the number of the raised strips and the recessed grooves, for example, may be 2-8. In the embodiment, the number of the raised strips and the recessed grooves are four respectively, and the four raised strips are arranged at an equal interval along the circumferential direction of the second accommodating cavity 230, and the four recessed grooves corresponding to the four raised strips are arranged at an equal interval along the circumferential direction of the second matching member 300.

By the first guiding structure 320 and the second guiding structure 231, the second matching member 300 may move in the stretching and retracting directions of the elastic member 400 (i.e., the spring), i.e., in the direction X of the first axis, and the rotation of the second matching member 300 may be limited, and the second matching member 300 may slide only in the stretching and retracting directions of the elastic member 400 (i.e., the spring).

In an embodiment, the first hinge seat 100, the second hinge seat 200 and the second matching member 300 of the present embodiment are all made of hard plastic parts, such as wear-resistant materials such as polyformaldehyde (POM) material, nylon, and the like.

The hinge assembly structure of the present embodiment may be assembled through a connecting shaft 500. The first hinge portion 110, the second hinge portion 210, the second matching member 300, and the elastic member 400 are all provided with through holes 510, where the through holes 510 may be coaxial with the second accommodating cavity 230 and the first accommodating cavity 130. When the elastic member 400 is a spring, the through hole 510 of the elastic member 400 is also the inner space of the helix of the spring. The connecting shaft 500 passes through the first hinge portion 110 (including the first matching member 140), the second matching member 300 (including the second matching structure 310), the elastic member 400, and the second hinge portion 210 in turn, and fixes the first hinge seat 100, the second hinge seat 200, the elastic member 400, and the second hinge seat 200 as a whole. The connecting shaft 500 may be fixed by riveting, or it may be fixed and connected by matching member nuts at one or both ends of the connecting shaft 500.

Furthermore, the end of the first hinge portion 110 away from the second hinge portion 210 may be provided with a shim 600, and the connecting shaft 500 may be riveted or fixed with a nut after passing through the shim 600.

A notch 610 may be disposed at the edge of the shim 600, and the end surface of the first hinge portion 110 matched with the shim 600 may be provided with a protruding structure, and the protruding structure is matched with the notch 610 to prevent the shim 600 from rotating with the first hinge seat 100.

It could be understood that a shim 600 may also be provided at the end of the second hinge portion 210 away from the first hinge portion 110.

It should be noted that the height difference between the end of the fourth curved surface 312 away from the second matching surface 314 in the direction X of the first axis may adjust the suspending angle of the door body 30, and it has been found through testing and verification that the door body 30 may be suspended at 300 when the height is 2.2 millimeters. In some implementations, the height difference between the end of the fourth curved surface 312 away from the second matching surface 314 and the second matching surface 314 in the direction X of the first axis may be designed to be in the range of 1.5-3.5 millimeters, preferably 2.2 millimeters.

An embodiment of the present application further provides an opening and closing device including a cabinet 20 and a door body 30. The cabinet 20 has an opening 206 at one end, the door body 30 is hinged to the opening 206 of the cabinet 20 through the hinge assembly 10 provided in the present application or any embodiment of the present application, and the first rotation direction is in the same direction as the rotation direction of the door body 30 when it is opened.

The opening and closing device may be a freezer, for example, a bedroom freezer with an upwards opening door, the opening and closing device may also be other devices configured to open and close, such as a dishwasher, a storage cabinet, etc. When the opening and closing device is a bedroom freezer, the freezer also includes a control component for controlling refrigeration, etc., and the first hinge seat 100 is an upper seat connected to the door body 30, and the second hinge seat 200 is a lower seat connected to the cabinet 20 (i.e., the box), and the hinged assembly 10 may make the product more reliable in closing the door, reduce the risk of flashing, and reduce the waste of refrigeration capacity in the freezer.

Two structures of the opening and closing device are described below through two embodiments.

Figure 20:
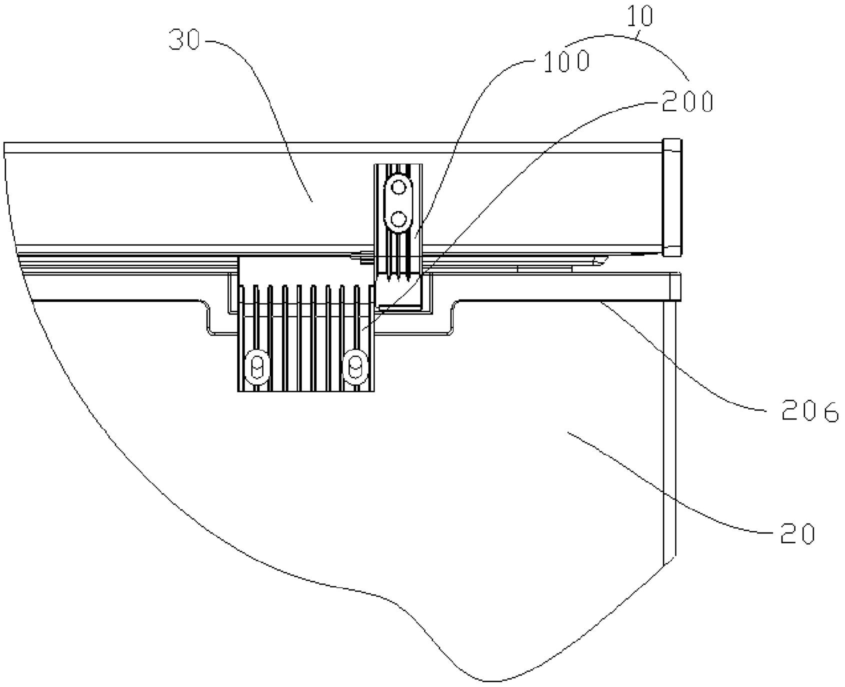
FIG. 20 schematically illustrates a partial schematic diagram of an opening and closing device according to an embodiment of the present application.
Figure 21:
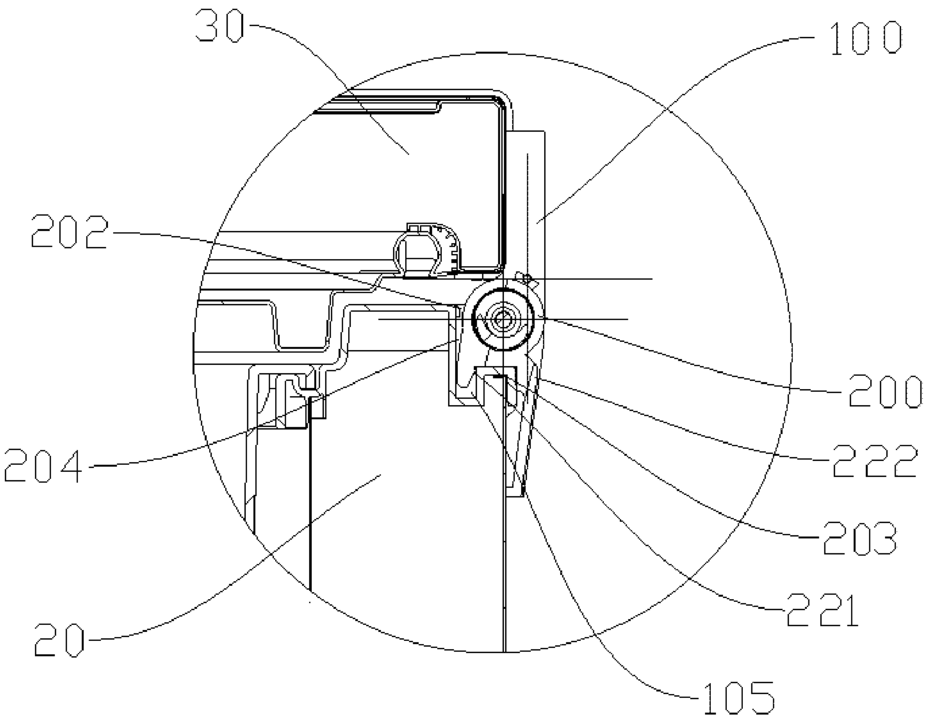
FIG. 21 schematically illustrates a schematic diagram of a second hinge seat of FIG. 20 assembled on a cabinet according to an embodiment of the present application.

As shown in FIG. 20 and FIG. 21, in one embodiment, the outer wall of the cabinet 20 is provided with a mounting cavity 204 recessed towards an interior of the cabinet 20, and the mounting cavity 204 is provided with a third opening 202 facing the opening and a fourth opening 203 facing the exterior of the cabinet 20, and a side of the mounting cavity 204 away from the third opening 202 is provided with a trench 105; and the door body 30 may be connected to the opening 206 of the cabinet 20 by the hinge assembly 10. The hinge assembly 10 includes a second hinge seat 200 and a first hinge seat 100 rotatably connected, and the first hinge seat 100 is connected to a side wall of the door body 30, and the hinged ends of the second hinge seat 200 and the first hinge seat 100 are disposed in the mounting cavity 204, and a first sub-lock plate 221 and a second sub-lock plate 222 are disposed on the side of the hinged end of the second hinge seat 200 away from the first hinge seat 100, where the first sub-lock plate 221 is embedded in the trench 105, and the second sub-lock plate 222 is connected to an outer side wall of the door body 30.

In the opening and closing device provided in the embodiment of the present application, the hinge assembly 10 for connecting the door body 30 and the cabinet 20 includes a second hinge seat 200 and a first hinge seat 100 rotatably connected, where the second hinge seat 200 is connected to an outer surface of the door body 30, and the hinged ends of the second hinge seat 200 and the first hinge seat 100 are both disposed in the mounting cavity 204. Since the mounting cavity 204 is recessed from the outer wall of the cabinet 20 to the interior of the cabinet 20, the size of the hinge assembly 10 protruding outside the cabinet 20 may be reduced to a given extent, and thus the gap between the packaging cabinet for packaging equipment and the equipment may be decreased, the packaging quantity of the product is improved, the freight charge of the product is reduced, and good practicality is achieved.

The cabinet 20 may be provided with only one or more openings, and when more openings are disposed, door bodies 30 may also be provided, and some of the door bodies 30 may be connected to the opening of the corresponding cabinet 20 using the above-described assembly method, and for the door bodies 30 that do not affect the amount of packing quantity, the assembly method in the related art may also be used without any limitations.

The opening of the freezer is usually disposed at the top of the product. When the opening is disposed at other portions, it may be adjusted accordingly. It is not repeated here.

The first hinge seat 100 may include a first lock plate 120, and the first lock plate 120 may be provided with two second mounting holes 223, and the second mounting hole 223 may be a bolt hole. The first lock plate 120 is connected to the door body 30 by the bolt provided in the corresponding second mounting holes 223 to assemble the first hinge seat 100 with the door body 30.

In the embodiments of the present application, the second mounting holes 223 may be disposed at intervals in the vertical direction, and only two bolts are required to assemble the first lock plate 120 to the door body 30. In other implementations, the second mounting holes 223 may also be disposed at intervals in the horizontal direction, and more second mounting holes 223 may also be provided, without limitation herein.

Referring to FIG. 1, FIG. 3, and FIG. 7, the hinged end of the first hinge seat 100 may be cylindrical and is integrated with the first lock plate 120. The side of the first lock plate 120 facing the door body 30 is a flat surface, and the side of the first lock plate 120 facing away from the door body 30 may be provided with reinforcing ribs 160. The reinforcing ribs 160 may be disposed in the vertical direction, and the reinforcing ribs 160 may extend from the first lock plate 120 to a circumferential surface of the first hinge seat 100 to enhance the strength of the first hinge seat 100 and prolong the service life of the first hinge seat 100.

A first accommodating cavity 130 is provided at the hinged end of the first hinge seat 100, and the first accommodating cavity 130 may be disposed in a cylindrical shape. An axial end of the first accommodating cavity 130 facing the second hinge seat 200 is provided with an open, i.e., a second opening.

The hinged end of the second hinge seat 200 may also be cylindrical, and the first sub-lock plate 221 and the second sub-lock plate 222 may be disposed opposite to each other on both sides of the hinged end of the second hinge seat 200, and the first sub-lock plate 221 and the second sub-lock plate 222 may be integrated with the hinged end of the second hinge seat 200. A vertical size of the second sub-lock plate 222 may be larger than the vertical size of the first sub-lock plate 221 to facilitate assembly of the first sub-lock plate 221 and the second sub-lock plate 222 on the mounting cavity 204. The second sub-lock plate 222 is provided with two first mounting holes 121, and the first mounting holes 121 may be a bolt hole, and the second sub-lock plate 222 is connected to an outer surface of the cabinet 20 by the bolt provided in the corresponding first mounting hole 121. The first mounting holes 121 may be ovaloid, which facilitates the adjustment of the mounting position of the second hinge seat 200 and the assembly of the hinge assembly 10 on the opening and closing device.

The first mounting holes 121 according to the embodiment of the present application may be disposed at intervals in the horizontal direction, and only two bolts are required to assemble and connect the second sub-lock plate 222 to the cabinet 20. In other implementations, the first mounting hole 121 may also be disposed at intervals in the vertical direction, and there may be more first mounting hole 121, without limitation herein.

It should be noted that both the first mounting hole 121 and the second mounting hole 223 in the embodiment of the present application are countersunk holes to avoid the corresponding bolts protruding out of the surface and affecting the packaging quantity of the product.

The side of the second sub-lock plate 222 facing away from the first sub-lock plate 221 (i.e., the outer side of the second sub-lock plate 222) is provided with reinforcing ribs 160. The reinforcing ribs 160 may be provided in the vertical direction, and may extend from the second sub-lock plate 222 to the circumferential surface of the hinged end of the second hinge seat to improve the strength of the second hinge seat 200 and to prolong the service life of the second hinge seat 200.

The hinged end of the second hinge seat 200 is provided with a second accommodating cavity 230, and the second accommodating cavity 230 may be provided in in a cylindrical shape. The first accommodating cavity 130 is open at an axial end towards the first hinge seat 100, i.e., a second opening is provided. The first accommodating cavity 130 and the second accommodating cavity 230 are provided opposite to each other, and the end of the first accommodating cavity 130 opposite to the second accommodating cavity 230 is open, and the other end of the two abuts against the two ends of the trench 105.

As shown in FIG. 1 to FIG. 19, some embodiments are mainly different from the other embodiments in that the connection structure between the hinge assembly 10, the cabinet 20, and the door body 30 is different.

In an embodiment, the first lock plate 120 may be provided with three first mounting holes 121, where two first mounting holes 121 are provided at intervals and aligned along the direction X of the first axis, and one first mounting hole 121 is provided on the side of the above two first mounting holes 121 close to the second sub-lock plate 222, i.e., the three first mounting holes 121 may be arranged in a triangular shape in sequence.

The door body 30 is provided with a slot 207 at both ends of the trench 105. Raised strips 211 protrude from the end surface of the second hinge portion 210 away from the first hinge seat 100. Both ends of the slit 105 are provided with slots 207. The first hinge seat 100 and the second hinge seat 200 are provided in the mounting cavity 204. The raised strips 211 are inserted in the slots 207 at the corresponding end. The slots 207 are matched with the raised strips 211 to embed and fix the first sub-lock plate 221 and the cabinet 20.

Furthermore, the second hinge portion 210 is provided with an extension portion 212 integrated with the raised strip 211 on an end surface away from the first hinge seat 100. During rotation of the first hinge seat 100 relative to the second hinge seat 200, the torque between the second hinge seat 200 and the cabinet 20 in this embodiment is mainly concentrated on the raised strips 211 and the side wall of the slots 207, and the raised strips 211 are prone to be damaged due to stress concentration. By providing the extension portions 212, the length of the raised strips 211 is extended, and the strength of the raised strips 211 is enhanced. In actual testing, the possibility of the raised strip 211 being damaged is greatly reduced.

It should be noted that the raised strips 211 may also be disposed on the end face of the first hinge portion 110 facing away from the second hinge portion 210, and the raised strips 211 may be also matched with the slot 207 at the corresponding end.

The above are only some embodiments of the present application, the protection scope of the present application is not limited thereto. Any changes or substitutions that may be easily thought of within the scope of the disclosed in the present application should be covered within the protection scope of the present application. Therefore, the protection scope of the present application should be based on the protection scope of the claims.

What is claimed is:

1. A hinge assembly configured to be used in an opening and closing device, the opening and closing device comprising a cabinet and a door body, the cabinet having an opening, the door body hinged to the opening of the cabinet through the hinge assembly:

wherein the hinge assembly comprises:

a first matching member provided in the door body, and provided with a first curved surface and a second curved surface at one end of the first matching member;

a second matching member provided in the cabinet, and provided with a third curved surface and a fourth curved surface at one end of the second matching member; and an elastic member located at a side of the second matching member away from the first matching member; wherein the elastic member applies the axial force to the second matching member and the first matching member;

the hinge assembly has a first state and a second state, and the first matching member and the second matching member are rotatable relative to each other around a first axis to be switchable between the first state and the second state; and in the first state, the door body is open, and the first curved surface abuts against and is matched with the third curved surface to make the first matching member and the second matching member have a first acting force under an axial force, the first acting force having opposite direction as gravity; and in the second state, the door body is close, and the second curved surface abuts against and is matched with the fourth curved surface to make the first matching member and the second matching member have a second acting force under the axial force, the second acting force having same direction as gravity;

the door body is configured to suspend in the first state;

the second matching member has a stop surface connected to an end of the fourth curved surface and extends to the first matching member; and when the door body rotates until the first matching member and the second matching member are in the second state, the stop surface is configured to match with the first curved surface to limit the first matching member from continuing to rotate towards direction of closing the door body.

2. The hinge assembly of claim 1, wherein the first curved surface, the second curved surface, the third curved surface, and the fourth curved surface are helical surfaces, the first curved surface and the second curved surface have opposite helical directions, the third curved surface and the fourth curved surface have opposite helical directions, the first curved surface and the third curved surface have the same helical direction, and the second curved surface and the fourth curved surfaces have the same helical direction.

3. The hinge assembly of claim 2, wherein the first curved surface, the second curved surface, the third curved surface and the fourth curved surface all extend helically in a direction of the first axis.

4. The hinge assembly of claim 1, wherein the first curved surface and the second curved surface are disposed along a circumferential direction of the first matching member, and the third curved surface and the fourth curved surface are disposed along a circumferential direction of the second matching member, and both the circumferential direction of the first matching member and the circumferential direction of the second matching member are perpendicular to the direction of the first axis.

5. The hinge assembly of claim 4, wherein the first matching member further has a first matching surface disposed between the first curved surface and the second curved surface;

the second matching member further has a second matching surface disposed between the third curved surface and the fourth curved surface; and both the first matching surface and the second matching surface are perpendicular to the direction of the first axis, and the hinge assembly has a third state between the first state and the second state; and in the third state, the first matching surface abuts against and is matched with the second matching surface.

6. The hinge assembly of claim 5, wherein both the first curved surface and the second curved surface are provided on a side of the first matching surface away from the second matching member, and both the third curved surface and the fourth curved surface are provided on a side of the second matching surface away from the first matching member.

7. The hinge assembly according to claim 1, wherein the first matching member comprises a plurality of first protrusion portions disposed at intervals along a circumferential direction of the first matching member, and each of the plurality of first protrusion portions is provided with the first curved surface and the second curved surface;

the second matching member comprises a plurality of second protrusion portions disposed at intervals along a circumferential direction of the second matching member, and each of the plurality of second protrusion portions is provided with the third curved surface and the fourth curved surface; and the plurality of the first protrusion portions are provided in one-to-one correspondence with the plurality of the second protrusion portions; and both the circumferential direction of the first matching member and the circumferential direction of the second matching member are perpendicular to the direction of the first axis.

8. The hinge assembly according to claim 1, wherein at least one of the first curved surface, the second curved surface, the third curved surface or the fourth curved surface is provided with an oil storage tank.

9. The hinge assembly according to claim 1, further comprising:

a first hinge seat, wherein the first hinge seat is connected to the first matching member, and the first hinge seat rotates synchronously with the first matching member;

a second hinge seat, wherein the second hinge seat is connected to the second matching member, and the second hinge seat rotates synchronously with the second matching member;

wherein the first hinge seat is rotatably connected to the second hinge seat, and the first matching member is slidably connected to the first hinge seat in a direction of the first axis and/or the second matching member is slidably connected to the second hinge seat in a direction of the first axis.

10. The hinge assembly of claim 9, wherein the first hinge seat is provided with a first accommodating cavity extending in a direction of the first axis, and the second hinge seat is provided with a second accommodating cavity extending in a direction of the first axis, and the first accommodating cavity communicates with the second accommodating cavity, and the first matching member is disposed in the first accommodating cavity, and the second matching member is disposed in the second accommodating cavity;

wherein the elastic member is provided in the second accommodating cavity.

11. The hinge assembly of claim 10, wherein the first hinge seat is integrated with the first matching member, and the second matching member is slidable within the second accommodating cavity in the direction of the first axis.

12. The hinge assembly of claim 10, wherein the first hinge seat comprises a first lock plate and a first hinge portion, and the first lock plate is integrated with the first hinge portion, and the first accommodating cavity is provided in the first hinge portion;

the second hinge seat comprises a second lock plate and a second hinge portion, and the second lock plate is integrated with the second hinge portion, and the second accommodating cavity is provided in the second hinge portion; and the first hinge portion is rotatably connected to the second hinge portion.

13. The hinge assembly of claim 12, wherein a relief hole is disposed at an end of the first hinge portion away from the second hinge portion, and the relief hole communicates with the first accommodating cavity; and/or a relief hole is disposed at an end of the second hinge portion away from the first hinge portion, and the relief hole communicates with the second accommodating cavity.

14. The hinge assembly of claim 9, wherein the first hinge seat is provided with a first positioning portion, and the second hinge seat is provided with a second positioning portion; and the second positioning portion is matchable with the first positioning portion to position the first hinge seat and the second hinge seat at an initial mounting angle, and the first positioning portion is disconnectable from the first hinge seat, and/or the second positioning portion is disconnectable from the second hinge seat.

15. An opening and closing device, comprising:

a cabinet, having an opening; and a door body, hinged to the opening of the cabinet through a hinge assembly;

wherein the hinge assembly comprises:

a first matching member provided in the door body, and provided with a first curved surface and a second curved surface at one end of the first matching member;

a second matching member provided in the cabinet, and provided with a third curved surface and a fourth curved surface at one end of the second matching member; and an elastic member located at a side of the second matching member away from the first matching member; wherein the elastic member applies the axial force to the second matching member and the first matching member;

wherein the hinge assembly has a first state and a second state, and the first matching member and the second matching member are rotatable relative to each other around a first axis to be switchable between the first state and the second state; and in the first state, the door body is open, and the first curved surface abuts against and is matched with the third curved surface to make the first matching member and the second matching member have a first acting force under an axial force, the first acting force having opposite direction as gravity; and in the second state, the door body is close, and the second curved surface abuts against and is matched with the fourth curved surface to make the first matching member and the second matching member have a second acting force under the axial force, the second acting force having same direction as gravity;

the door body is configured to suspend in the first state; the second matching member has a stop surface connected to an end of the fourth curved surface and extends to the first matching member; and when the door body rotates until the first matching member and the second matching member are in the second state, the stop surface is configured to match with the first curved surface to limit the first matching member from continuing to rotate towards direction of closing the door body.

16. The opening and closing device of claim 15, wherein the opening and closing device is a freezer.

17. The opening and closing device of claim 15, wherein the first curved surface, the second curved surface, the third curved surface, and the fourth curved surface are helical surfaces, the first curved surface and the second curved surface have opposite helical directions, the third curved surface and the fourth curved surface have opposite helical directions, the first curved surface and the third curved surface have the same helical direction, and the second curved surface and the fourth curved surfaces have the same helical direction.

18. The opening and closing device of claim 17, wherein the first curved surface, the second curved surface, the third curved surface and the fourth curved surface all extend helically in a direction of the first axis.

19. The hinge assembly of claim 5, wherein opening angle of the door body corresponding to the third state is configured to be a threshold between suspending the door body and being unable to suspend, and when the opening angle of the door body is greater than the opening angle of the door body corresponding to the third state, the door body is configured to suspend; and when the opening angle of the door body is less than the opening angle of the door body corresponding to the third state, the door body is not configured to suspend.

* * * * *